US009529238B2

(12) United States Patent
Tamaki et al.

(10) Patent No.: US 9,529,238 B2
(45) Date of Patent: Dec. 27, 2016

(54) LIQUID CRYSTAL DISPLAY DEVICE AND ELECTRONIC APPARATUS

(71) Applicant: Japan Display Inc., Tokyo (JP)

(72) Inventors: Masaya Tamaki, Tokyo (JP); Toshiharu Matsushima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/226,272

(22) Filed: Mar. 26, 2014

(65) Prior Publication Data

US 2014/0293176 A1 Oct. 2, 2014

(30) Foreign Application Priority Data

Mar. 29, 2013 (JP) ................................ 2013-075002
Mar. 20, 2014 (JP) ................................ 2014-059228

(51) Int. Cl.
*G02F 1/1343* (2006.01)

(52) U.S. Cl.
CPC .............................. *G02F 1/134363* (2013.01)

(58) Field of Classification Search
CPC ......................... G02F 1/134363; G02F 1/1337
USPC .................................................. 349/141, 33
See application file for complete search history.

(56) References Cited

U.S. PATENT DOCUMENTS 8,384,867 B2 * 2/2013 Ishii .................. G02F 1/133707 349/139
2006/0023152 A1 * 2/2006 Ohta ................. G02F 1/134363 349/141
2014/0160386 A1 * 6/2014 Toko ................. G02F 1/133784 349/42
2014/0192298 A1 * 7/2014 Sumiyoshi ........ G02F 1/134336 349/96
2015/0042922 A1 * 2/2015 Kawahira ......... G02F 1/133555 349/61

FOREIGN PATENT DOCUMENTS

JP 2008-052161 3/2008

* cited by examiner

*Primary Examiner* — Richard Kim
(74) *Attorney, Agent, or Firm* — Michael Best & Friedrich LLP

(57) ABSTRACT

According to an aspect, a liquid crystal display device includes: a first substrate and a second substrate that face each other; a liquid crystal layer provided between the first substrate and the second substrate; and a first electrode and a second electrode provided between the first substrate and the liquid crystal layer. The first electrode includes: at least an electrode base portion that extends in a first direction; and a plurality of comb-shaped portions that protrude from the electrode base portion at a fixed distance away from each other, and extend in a second direction different from the first direction. Each comb-shaped portion has a coupling portion layered on or under the electrode base portion.

16 Claims, 20 Drawing Sheets

76b
31
S
S
Y
X
132
131a
131b
131
132
Rub

LIQUID CRYSTAL DISPLAY DEVICE AND ELECTRONIC APPARATUS

CROSS-REFERENCE TO RELATED APPLICATIONS

This application claims priority from Japanese Application No. 2013-075002, filed on Mar. 29, 2013, and Japanese Application No. 2014-059228, filed on Mar. 20, 2014, the contents of which are incorporated by reference herein in its entirety.

BACKGROUND

1. Technical Field

The present disclosure relates to a liquid crystal display device with liquid crystal. The present disclosure also relates to an electronic apparatus including the liquid crystal display device with liquid crystal.

2. Description of the Related Art

As a system (mode) of driving liquid crystal, a liquid crystal drive system using an electric field generated in a vertical direction between substrates, i.e., using a so-called vertical electric field is known. As a liquid crystal display device that drives liquid crystal using the vertical electric field, a liquid crystal display device of a vertical electric field type such as a twisted nematic (TN) type, a vertical alignment (VA) type, and an electrically controlled birefringence (ECB) type is known. In addition, as described in Japanese Patent Application Laid-open Publication No. 2008-52161 (JP-A-2008-52161), as a system of driving liquid crystal, a liquid crystal drive system using an electric field generated in a direction (horizontal direction) parallel to a substrate, i.e., using a so-called horizontal electric field is known. As the liquid crystal display device that drives liquid crystal using the horizontal electric field, a liquid crystal display device of the horizontal electric field type such as a fringe field switching (FFS) type and an in-plane switching (IPS) type is also known.

The horizontal electric field type liquid crystal display device is configured to generate an electric field between a first electrode and a second electrode and in a direction parallel to a substrate to thereby rotate liquid crystal molecules in plane parallel to the substrate surface, and to perform a display using a change in light transmittance corresponding to the rotation of the liquid crystal molecules. The horizontal electric field type liquid crystal display device is required to improve a response speed of the liquid crystal. However, a shape of the first electrode or of the second electrode that improves the response speed may cause light transmission loss to occur.

For the foregoing reasons, there is a need for the liquid crystal display device and the electronic apparatus with the liquid crystal display device capable of improving the response speed and reducing the light transmission loss.

SUMMARY

According to an aspect, a liquid crystal display device includes: a first substrate and a second substrate that face each other; a liquid crystal layer provided between the first substrate and the second substrate; and a first electrode and a second electrode provided between the first substrate and the liquid crystal layer. The first electrode includes: at least an electrode base portion that extends in a first direction; and a plurality of comb-shaped portions that protrude from the electrode base portion at a fixed distance away from each other, and extend in a second direction different from the first direction. Each comb-shaped portion has a coupling portion layered on or under the electrode base portion.

According to another aspect, An electronic apparatus includes: a liquid crystal display device; and a control device that supplies an input signal to the liquid crystal display device.

DETAILED DESCRIPTION

Exemplary embodiments of the present disclosure will be explained in detail below with reference to the accompanying drawings. The present disclosure is not limited by the contents described in the following embodiments. In addition, the components described as follows include those which can be easily conceived by persons skilled in the art and those which are substantially identical thereto. Moreover, the components described as follows can be arbitrarily combined with each other. The explanation is performed in the following order.

1. Embodiments (Liquid Crystal Display Device)

1-1. First Embodiment 1-2. Second Embodiment

2. Application Examples (Electronic Apparatuses)

Examples of applying the liquid crystal display device according to the embodiments to electronic apparatuses.

3. Aspects of Present Disclosure

1. EMBODIMENTS

Liquid Crystal Display Device

1-1. First Embodiment

Figure 1:
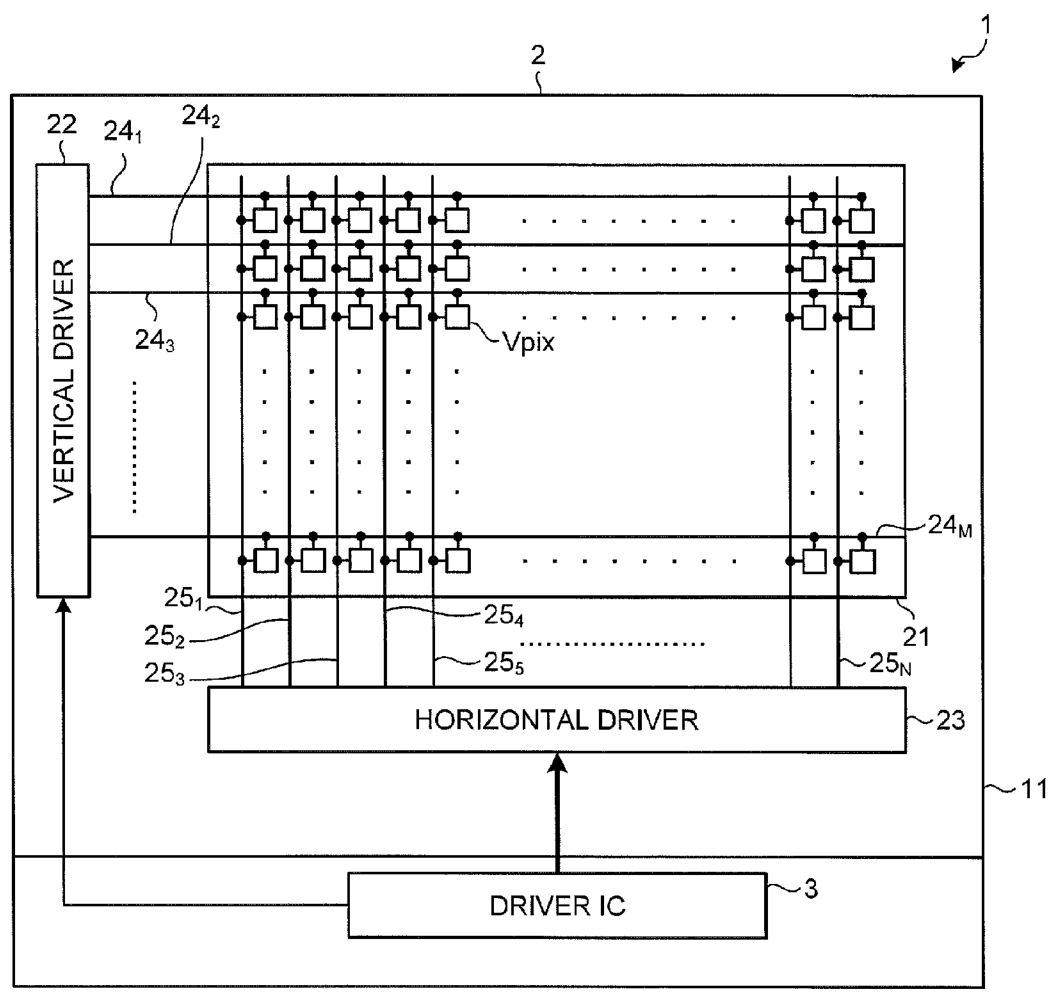
FIG. 1 is a block diagram of a system configuration example of a liquid crystal display device according to a first embodiment.

FIG. 1 is a block diagram of a system configuration example of a liquid crystal display device according to a present embodiment. A display device 1 corresponds to a specific example of "liquid crystal display device" according to the present disclosure.

The display device 1 is a transmissive liquid crystal display device, and includes a display panel 2 and a driver integrated circuit (IC) 3. Flexible printed circuits (FPC) (not illustrated) transmit an external signal and/or drive power for driving the driver IC 3 to the driver IC 3. The display panel 2 includes a translucent insulating substrate such as a glass substrate 11, a display area 21 provided on the surface of the glass substrate 11 and on which a number of pixels including liquid crystal cells are arranged in a matrix (in the form of rows and columns), a horizontal driver (horizontal drive circuit) 23, and a vertical driver (vertical drive circuit) 22. The glass substrate 11 includes a first substrate, on which a number of pixel circuits including active elements (e.g., transistors) are arranged in a matrix, and a second substrate arranged opposite to the first substrate with a predetermined gap. The gap between the first substrate and the second substrate is kept at a predetermined gap by photo spacers formed and disposed at locations on the first substrate. The liquid crystal is then sealed between the first substrate and the second substrate.

System Configuration Example of Liquid Crystal Display Device

The display panel 2 includes the display area 21, the driver IC 3 having functions of an interface (I/F) and a timing generator, the vertical driver 22, and the horizontal driver 23, which are provided on the glass substrate 11.

In the display area 21, pixels Vpix that include a liquid crystal layer have a matrix structure in which units each forming one pixel on the display are arranged in M rows×N columns. In this specification, the row indicates a pixel row having N pieces of pixels Vpix arrayed in one direction. The column indicates a pixel column having M pieces of pixels Vpix arrayed in a direction perpendicular to the direction in which the pixels Vpix included in the row are arrayed. The values of M and N are determined according to a vertical display resolution and a horizontal display resolution. In the display area 21, each of scan lines $\mathbf{24}_1$, $\mathbf{24}_2$, $\mathbf{24}_3$ . . . $\mathbf{24}_M$ is wired in each row and each of data lines $\mathbf{25}_1$, $\mathbf{25}_2$, $\mathbf{25}_3$ . . . $\mathbf{25}_N$ is wired in each column with respect to an M-row/N-column array of the pixels Vpix. In the embodiments, scan lines 24 may be hereinafter described as a representative of the scan lines $\mathbf{24}_1$, $\mathbf{24}_2$, $\mathbf{24}_3$ . . . $\mathbf{24}_M$, and data lines 25 may be hereinafter described as a representative of the data lines $\mathbf{25}_1$, $\mathbf{25}_2$, $\mathbf{25}_3$ . . . $\mathbf{25}_N$. Moreover, in the embodiments, arbitrary three scan lines of the scan lines $\mathbf{24}_1$, $\mathbf{24}_2$, $\mathbf{24}_3$ . . . $\mathbf{24}_M$ are described as scan lines $\mathbf{24}_m$, $\mathbf{24}_{m+1}$, and $\mathbf{24}_{m+2}$ (where m is a natural number satisfying $m \leq M-2$), and arbitrary three data lines of the data lines $\mathbf{25}_1$, $\mathbf{25}_2$, $\mathbf{25}_3$ . . . $\mathbf{25}_N$ are described as data lines $\mathbf{25}_n$, $\mathbf{25}_{n+1}$, and $\mathbf{25}_{n+2}$ (where n is a natural number satisfying $n \leq N-2$).

The display device 1 receives a master clock, a horizontal synchronization signal, and a vertical synchronization signal, which are external signals, input from an external device, and supplies the signals to the driver IC 3. The driver IC 3 converts the level of the master clock, the horizontal synchronization signal, and the vertical synchronization signal each of which has a voltage magnitude of an external power supply to a voltage magnitude of an internal power supply required for driving the liquid crystal, to generate a master clock, a horizontal synchronization signal, and a vertical synchronization signal. The driver IC 3 supplies the generated master clock, horizontal synchronization signal, and vertical synchronization signal to the vertical driver 22 and the horizontal driver 23 respectively. The driver IC 3 generates common potential for a common electrode COM, explained later, for each pixel Vpix, to be commonly applied to the pixels, and supplies the generated common potential to the display area 21.

The vertical driver 22 synchronizes a vertical clock pulse to sequentially sample and latch display data output from the driver IC 3 in one horizontal period. The vertical driver 22 sequentially outputs the latched one-line digital data as a vertical scan pulse to be supplied to the scan lines $\mathbf{24}_m$, $\mathbf{24}_{m+1}$, and $\mathbf{24}_{m+2}$ . . . of the display area 21, and thereby sequentially selects pixels Vpix row by row. The vertical driver 22 sequentially outputs the digital data from, for example, an upper side of the scan lines $\mathbf{24}_m$, $\mathbf{24}_{m+1}$, and $\mathbf{24}_{m+2}$ . . . of the display area 21, i.e., from an upper direction of vertical scanning to a lower side of the display area 21, i.e., to a lower direction of the vertical scanning. The vertical driver 22 can also sequentially output the digital data from the lower side of the scan lines $\mathbf{24}_m$, $\mathbf{24}_{m+1}$, and $\mathbf{24}_{m+2}$ . . . of the display area 21, i.e., from the lower direction of the vertical scanning to the upper side of the display area 21, i.e., to the upper direction of the vertical scanning.

The horizontal driver 23 is supplied with, for example, 6-bit R (red), G (green), and B (blue) digital video data Vsig. The horizontal driver 23 writes display data to each pixel Vpix of a row selected through vertical scanning performed by the vertical driver 22 for each pixel, or for each pixels, or for all pixels at one time via the data lines 25.

In the display device 1, when a direct voltage having the same polarity is continuously applied to liquid crystal elements, this possibly causes deterioration of specific resistance (substance-specific resistance) of the liquid crystal, or the like. The display device 1 adopts a drive system for inverting the polarity of a video signal in a predetermined period with respect to common potential of a drive signal in order to prevent the deterioration of the specific resistance (substance-specific resistance) of the liquid crystal, or the like.

As the drive system for the liquid crystal display panel, drive systems such as line inversion drive system, dot inversion drive system, and frame inversion drive system are known. The line inversion drive system is a drive system of inverting the polarities of video signals in a time period of 1H (H: horizontal period) corresponding to one line (one pixel row). The dot inversion drive system is a drive system of alternately inverting the polarities of video signals for each pixels on the left, right, top, and bottom adjacent to each other. The frame inversion drive system is a drive system of inverting video signals, which are written to all pixels for each frame corresponding to one screen, with the same polarity at one time. The display device 1 can also adopt any one of the drive systems.

Configuration Example of Display Area

Figure 2:
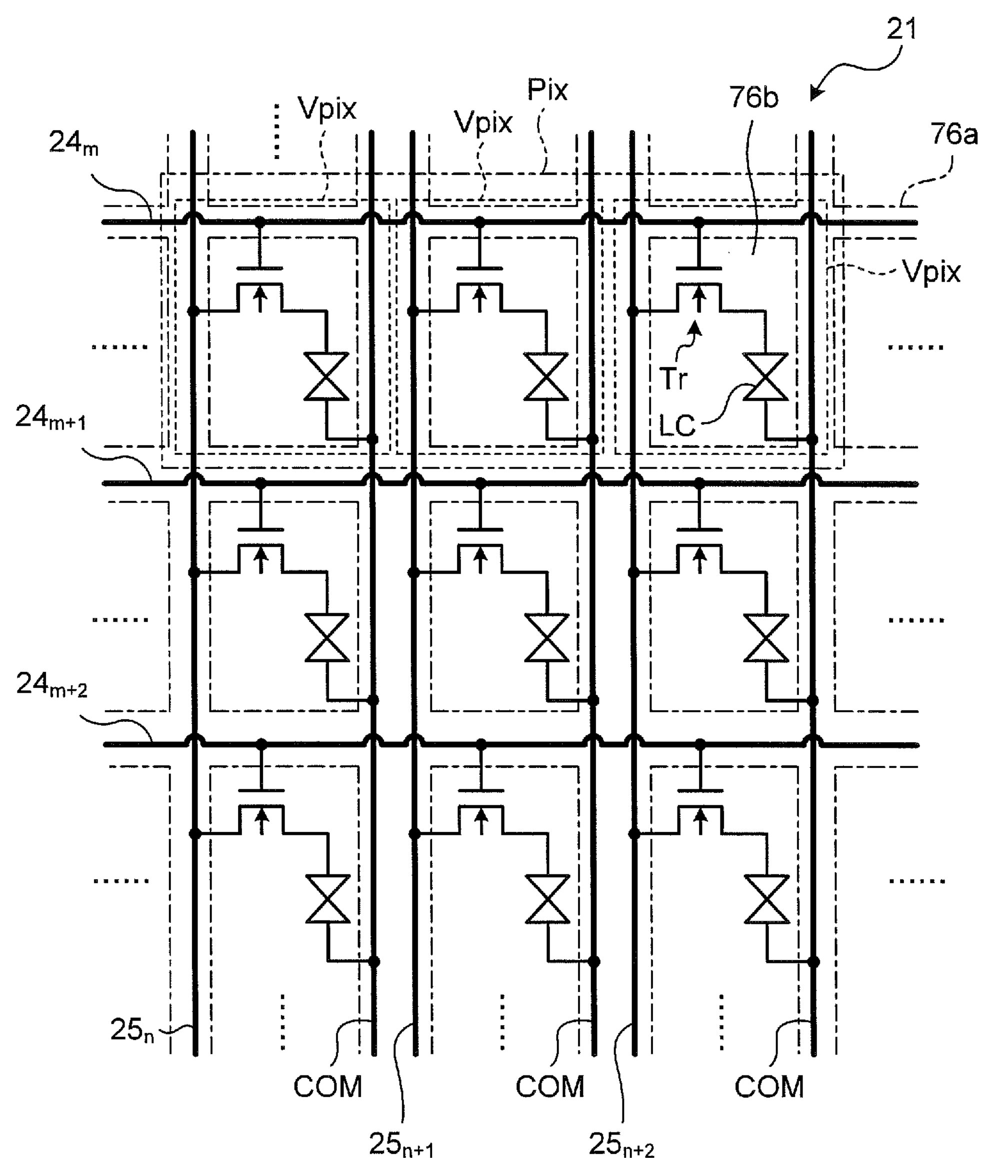
FIG. 2 is a circuit diagram of a drive circuit that drives pixels of the liquid crystal display device according to the first embodiment.

FIG. 2 is a circuit diagram of a drive circuit that drives pixels of the display device according to the first embodiment. Formed in the display area 21 are wirings such as the data lines $\mathbf{25}_n$, $\mathbf{25}_{n+1}$, and $\mathbf{25}_{n+2}$ for supplying a pixel signal as display data to thin film transistor (TFT) elements Tr of the pixels Vpix and the scan lines $\mathbf{24}_m$, $\mathbf{24}_{m+1}$, and $\mathbf{24}_{m+2}$ for driving the TFT elements Tr respectively. In this way, the data lines $\mathbf{25}_n$, $\mathbf{25}_{n+1}$, and $\mathbf{25}_{n+2}$ are extended along a plane parallel to the surface of the glass substrate 11, to supply the pixel signal for displaying an image to the pixels Vpix. Each pixel Vpix includes the TFT element Tr and a liquid crystal element LC. The TFT element Tr includes a thin film transistor, which is an re-channel metal oxide semiconductor (MOS) TFT in this example. One end of a source or a drain of the TFT element Tr is coupled to one of the data lines $\mathbf{25}_n$, $\mathbf{25}_{n+1}$, and $\mathbf{25}_{n+2}$, a gate thereof is coupled to one of the scan lines $\mathbf{24}_m$, $\mathbf{24}_{m+1}$, and $\mathbf{24}_{m+2}$, and the other end of the source or the drain is coupled to one end of the liquid crystal element LC. The liquid crystal element LC is coupled at one end to the other end of the source or the drain of the TFT element Tr, and is coupled at the other end to the common electrode COM.

The pixel Vpix is coupled to the other pixels Vpix belonging to the same row of the display area 21 through one of the scan lines $\mathbf{24}_m$, $\mathbf{24}_{m+1}$, and $\mathbf{24}_{m+2}$. The scan lines $\mathbf{24}_m$, and $\mathbf{24}_{m+1}$, and $\mathbf{24}_{m+2}$ are coupled to the vertical driver 22 and are supplied with a vertical scan pulse of a scan signal from the vertical driver 22. The pixel Vpix is also coupled to the other pixels Vpix belonging to the same column of the display area 21 through one of the data lines $\mathbf{25}_n$, $\mathbf{25}_{n+1}$, and $\mathbf{25}_{n+2}$. The data lines $\mathbf{25}_n$, $\mathbf{25}_{n+1}$, and $\mathbf{25}_{n+2}$ are coupled to the horizontal driver 23 and are supplied with a pixel signal from the horizontal driver 23. Furthermore, the pixel Vpix is coupled to the other pixels Vpix belonging to the same column of the display area 21 through the common electrode COM. The common electrode COM is coupled to the driver IC 3 and is supplied with a drive signal from the driver IC 3.

The vertical driver 22 illustrated in FIG. 1 applies a vertical scan pulse to the gates of the TFT elements Tr of the pixels Vpix through the scan lines $\mathbf{24}_m$, $\mathbf{24}_{m+1}$, and $\mathbf{24}_{m+2}$ illustrated in FIG. 2 to thereby sequentially select one row (one horizontal line), as a target to be driven for display, from among the pixels Vpix formed in the matrix in the display area 21. The horizontal driver 23 illustrated in FIG. 1 supplies the pixel signal to each of the pixels Vpix included in one horizontal line sequentially selected by the vertical driver 22 through the respective data lines $\mathbf{25}_n$, $\mathbf{25}_{n+1}$, and $\mathbf{25}_{n+2}$ illustrated in FIG. 2. The pixels Vpix perform display of one horizontal line according to the supplied pixel signal. The driver IC 3 applies a drive signal so as to drive the common electrode COM.

As explained above, the display device 1 drives the vertical driver 22 so as to sequentially scan the scan lines $\mathbf{24}_m$, $\mathbf{24}_{m+1}$, and $\mathbf{24}_{m+2}$ to thereby sequentially select one horizontal line. In the display device 1, the horizontal driver 23 supplies a pixel signal to the pixels Vpix belonging to the one horizontal line, to thereby perform display of the horizontal line one line by one line. Upon the display operation, the driver IC 3 applies the drive signal to the common electrode COM.

The display area 21 has a color filter. The color filter has a lattice-shaped black matrix 76*a* and openings 76*b*. The black matrix 76*a* is formed so as to cover the outer periphery of each pixel Vpix as illustrated in FIG. 2. That is, the black matrix 76*a* is arranged on boundaries each between two-dimensionally arranged pixel Vpix and pixel Vpix, and a lattice shape is thereby formed. The black matrix 76*a* is formed of a material having a high light absorptivity. The openings 76*b* are formed by the lattice shape of the black matrix 76*a* and are arranged corresponding to each pixel Vpix.

The openings 76*b* include color areas colored in three colors of, for example, red (R), green (G), and blue (B). The color filter is structured to periodically array the color areas colored in the three colors, for example, red (R), green (G), and blue (B) in the openings 76*b*, and to associate the three color areas of R, G, and B with the pixels Vpix illustrated in FIG. 2 such that a set of the three color areas constitutes a pixel Pix.

The color filter may be a combination of other colors if the color areas are colored in different colors. In the color filter, the luminance of the color area of green (G) is generally higher than the luminance of the color area of red (R) and of the color area of blue (B). However, the color filter may not be provided and the color area of white is made there. Alternatively, light transmissive resin may be used for color filter to make the color area of white.

In the display area 21, the scan lines 24 and the data lines 25 are arranged in an area where they overlap the black matrix 76*a* of the color filter when viewed from a direction perpendicular to the front. In other words, the scan lines 24 and the data lines 25 are hidden behind the black matrix 76*a* when viewed from the direction perpendicular to the front. In the display area 21, the openings 76*b* are areas where the black matrix 76*a* is not arranged.

As illustrated in FIG. 2, the scan lines $\mathbf{24}_m$, $\mathbf{24}_{m+1}$, and $\mathbf{24}_{m+2}$ are arranged at equal distances, and the data lines $\mathbf{25}_n$, $\mathbf{25}_{n+1}$, and $\mathbf{25}_{n+2}$ are also arranged at equal distances. The pixels Vpix are arranged in areas partitioned by the adjacent scan lines $\mathbf{24}_m$, $\mathbf{24}_{m+1}$, and $\mathbf{24}_{m+2}$ and the adjacent data lines $\mathbf{25}_n$, $\mathbf{25}_{n+1}$, and $\mathbf{25}_{n+2}$ in the same orientation.

Figure 3:
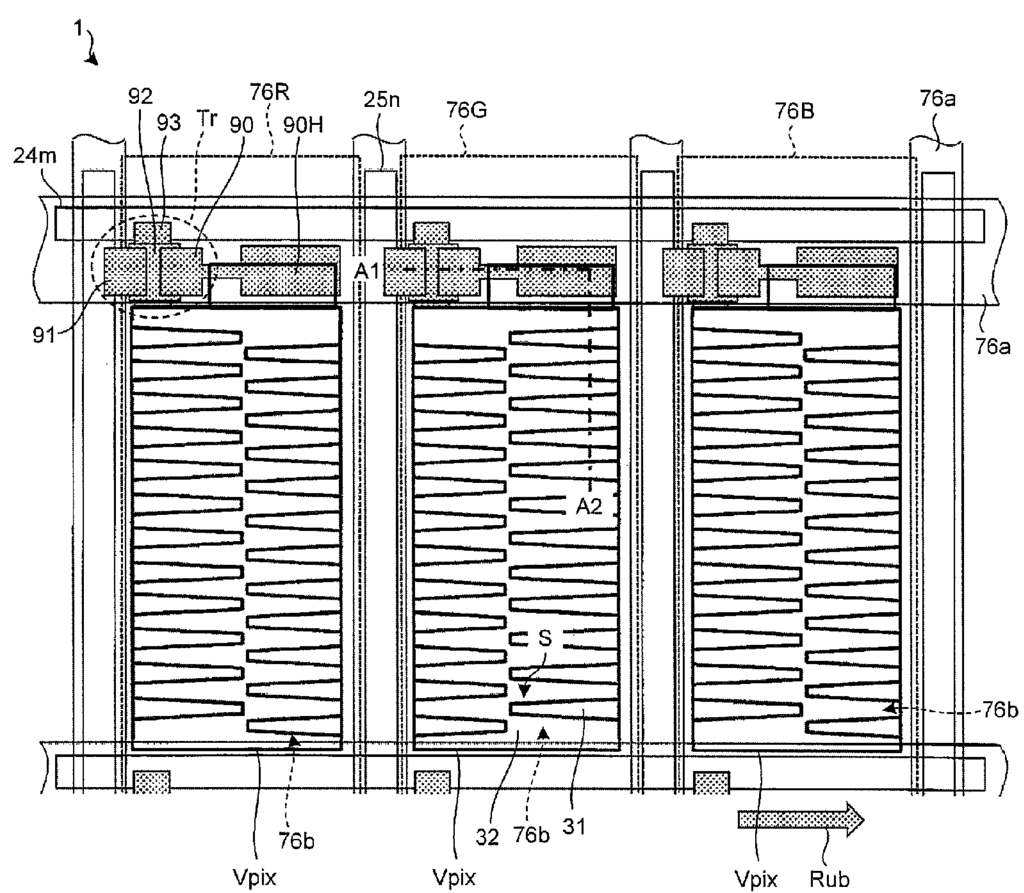
FIG. 3 is a plan view for explaining the pixels of the liquid crystal display device according to the first embodiment.

FIG. 3 is a plan view for explaining the pixels of the liquid crystal display device according to the first embodiment. Each of the pixels Vpix includes: the opening 76*b* formed in a lower part of the pixel in a vertical scanning direction (lower side in the figure); the TFT element Tr arranged in an upper left side of the pixel in the vertical scanning direction (upper side in the figure); and a contact 90H, through which a pixel electrode is coupled to a drain electrode of the TFT element Tr, formed in an upper right side of the pixel in the vertical scanning direction (upper side in the figure). The drain of the TFT element Tr includes part of a semiconductor layer (active layer) and a drain electrode 90. Likewise, the source of the TFT element Tr includes other part of the semiconductor layer (active layer) and a source electrode 91.

As for color filters 76R, 76G, and 76B, color areas of the color filter colored in the three colors of, for example, red (R), green (G), and blue (B) are periodically arranged in the openings 76*b* to form the color areas of the three colors of R, G, and B in the respective pixels Vpix illustrated in FIG. 2.

Figure 4:
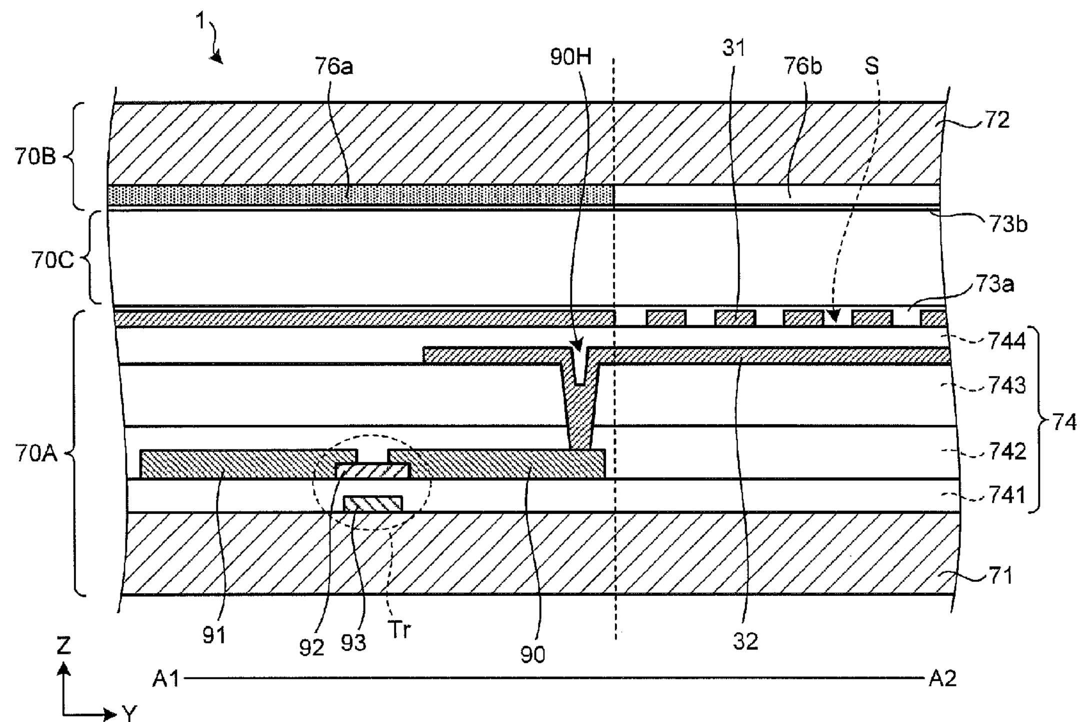
FIG. 4 is a schematic diagram of a cross section of line A1-A2 in FIG. 3.

FIG. 4 is a schematic diagram of a cross section of line A1-A2 in FIG. 3. The display device 1 includes, as illustrated in FIG. 4, a pixel substrate (first substrate) 70A, a counter substrate (second substrate) 70B oppositely arranged in a direction perpendicular to the surface of the pixel substrate 70A, and a liquid crystal layer 70C interposed between the pixel substrate 70A and the counter substrate 70B. A backlight (not illustrated) is arranged on the face of the pixel substrate 70A on the opposite side to the liquid crystal layer 70C. The photo spacers (not illustrated) keep a gap between the pixel substrate 70A and the counter substrate 70B at a predetermined gap.

In the liquid crystal layer 70C according to the first embodiment, an electric field (horizontal electric field) is generated in a direction parallel to a TFT substrate 71 of the pixel substrate 70A between a first electrode 31 and a second electrode 32 which are layered in a direction (Z direction) perpendicular to the surface of the TFT substrate 71, to thereby rotate the liquid crystal molecules of the liquid crystal layer 70C in plane parallel to the substrate surface, and a change in the light transmittance corresponding to the rotation of the liquid crystal molecules is used to perform display. For example, the second electrode 32 illustrated in FIG. 4 is the pixel electrode and the first electrode 31 is the common electrode COM. A first orientation film 73*a* and a second orientation film 73*b* are arranged between the liquid crystal layer 70C and the pixel substrate 70A and between the liquid crystal layer 70C and the counter substrate 70B, respectively, as illustrated in FIG. 4.

The counter substrate 70B includes a glass substrate 72 and the black matrix 76*a* having a light blocking effect formed over one face of the glass substrate 72. The black matrix 76*a* faces the liquid crystal layer 70C in the direction perpendicular to the pixel substrate 70A.

The pixel substrate 70A includes the TFT substrate 71 as a circuit board. The scan line $\mathbf{24}_m$ illustrated in FIG. 3 is formed on the TFT substrate 71. A gate electrode 93 is electrically coupled to the scan line $\mathbf{24}_m$. Further, in FIGS. 3 and 4, the scan line $\mathbf{24}_m$ and the gate electrode 93 are formed in different layers. However, both the scan line $\mathbf{24}_m$ and the gate electrode 93 can be integrally formed.

A semiconductor layer 92 including amorphous silicon (a-Si) being an active layer of the TFT element Tr is formed above the gate electrode 93. The semiconductor layer 92 is coupled to the source electrode 91 constituting the TFT element Tr. The source electrode 91 is a conductor and is electrically coupled to a part of the semiconductor layer 92. The source electrode 91 is electrically coupled to the data line $\mathbf{25}_n$ illustrated in FIG. 3. (The data line $\mathbf{25}_n$ is not illustrated in FIG. 4.) The semiconductor layer 92 is coupled to the drain electrode 90 constituting the TFT element Tr. The drain electrode 90 is electrically coupled to another part of the semiconductor layer 92. Further, in FIG. 3, the data line $\mathbf{25}_n$ and the source electrode 91 are formed in different layers. However, both the data line $\mathbf{25}_n$ and the source electrode 91 can be integrally formed.

An insulating layer 74 has, for example, an insulating film 741 between the scan line $\mathbf{24}_m$ and the semiconductor layer 92, an insulating film 742 between the semiconductor layer 92 and the data line $\mathbf{25}_n$, an insulating film 743 between the data line $\mathbf{25}_n$ and the second electrode 32, and an insulating film 744 between the second electrode 32 and the first electrode 31, which are layered in this order. The insulating films 741, 742, 743, and 744 may be the same insulating material as one another, or some of them may be a different material. For example, the insulating film 743 is formed of an organic-based insulating material such as polyimide resin, and the other insulating films (the insulating film 741, the insulating film 742, and the insulating film 744) are formed of an inorganic-based insulating material such as silicon nitride and silicon oxide.

The contact 90H formed of conductive metal is formed in a so-called contact hall to couple the drain electrode 90 and the second electrode 32. The first electrode 31 being the common electrode COM is supplied with the common potential commonly given to the pixels. The first electrode 31 and the second electrode 32 are translucent electrodes each formed of a translucent conductive material (translucent conductive oxide) such as indium tin oxide (ITO).

Figure 5:
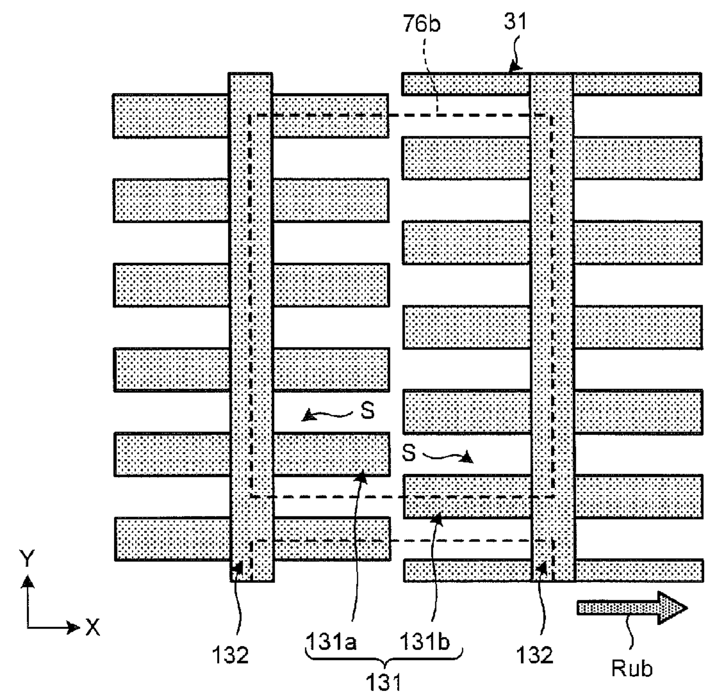
FIG. 5 is a schematic diagram for explaining a relation between a shape of a first electrode and an opening according to the first embodiment.

FIG. 5 is a schematic diagram for explaining a relation between a shape of the first electrode and an opening according to the first embodiment. As illustrated in FIG. 5, the first electrode 31 is formed into a comb shape by slits S each of which is an area without the conductive material. The first electrode 31 has a plurality of comb-shaped portions 131 protruding from electrode base portions 132 that extend in a Y direction. The comb-shaped portions 131 include comb-shaped portions 131*a* and comb-shaped portions 131*b* which extend from the electrode base portions 132 in opposite directions to each other. A plurality of comb-shaped portions 131*a* protrude from each electrode base portion 132 at a fixed distance away from each other. Likewise, a plurality of comb-shaped portions 131*b* protrude from each electrode base portion 132 at a fixed distance away from each other. From each electrode base portions 132, the comb-shaped portions 131*a* extend in an X direction and the comb-shaped portions 131*b* extend in the opposite direction to the X direction. The electrode base portions 132 are formed of a translucent conductive material (translucent conductive oxide) such as ITO, as well as the comb-shaped portions 131*a* and of the comb-shaped portions 131*b*.

The first orientation film 73*a* is subjected to a rubbing process in a rubbing direction Rub (first rubbing direction, first orientation direction) illustrated in FIG. 3 and FIG. 5 so as to have predetermined initial orientation characteristics in the X direction. The second orientation film 73*b* is subjected to a rubbing process in an antiparallel direction (second rubbing direction, second orientation direction) to the rubbing direction Rub of the first orientation film 73*a*. The rubbing directions (orientation directions) of the first orientation film 73*a* and the second orientation film 73*b* are antiparallel to each other. As explained above, the comb-shaped portions 131*a* extend in the X direction, the comb-shaped portions 131*b* extend in the opposite direction to the X direction, and the rubbing direction Rub is parallel to the extending direction of the comb-shaped portion 131*a* or of the comb-shaped portion 131*b*. The "parallel" mentioned here has only to be parallel to such an extent that a rotation direction LCQ of liquid crystal molecules Lcm illustrated in FIG. 9, explained later, can be maintained. More specifically, the extent includes a manufacturing error which is 0 degrees to 0.5 degrees. In the present embodiment, the first orientation film 73*a* and the second orientation film 73*b* so as to have the predetermined initial orientation characteristics are subjected to a rubbing process. However, it is not limited for the first orientation film 73*a* and the second orientation film 73*b* to have the predetermined initial orientation characteristics. Instead of the rubbing process, the first orientation film 73*a* and the second orientation film 73*b* can be formed of materials with photo-orientation characteristics to have the predetermined initial orientation characteristics.

Figure 6:
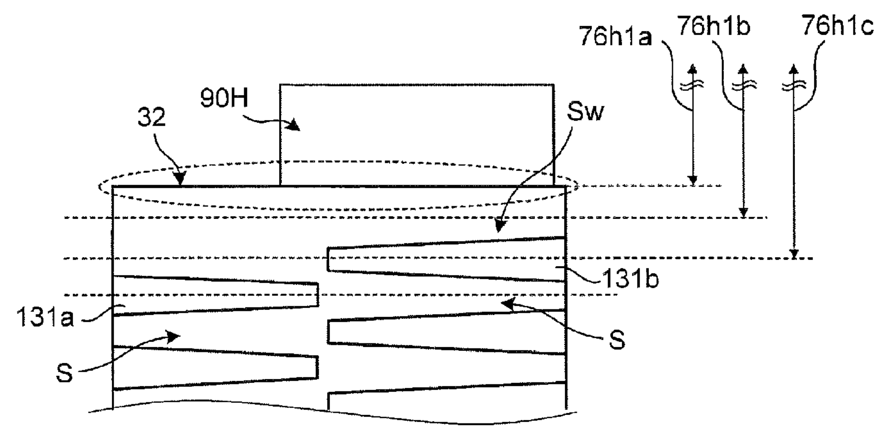
FIG. 6 is a schematic diagram for explaining a relation between the shape of the first electrode and a light blocking position according to the first embodiment.

FIG. 6 is a schematic diagram for explaining a relation between the shape of the first electrode and a light blocking position according to the first embodiment. The black matrix 76*a* has only to block light up to the position of a width 76*h*1*a* illustrated in FIG. 6 to hide the contact 90H. An electric field in an outermost slit Sw between the comb-shaped portion 131*b* near the edge of the opening 76*b* and the contact 90H is different in distribution from an electric field applied to the slit S between adjacent comb-shaped portions 131*a* or between adjacent comb-shaped portions 131*b*. Therefore, if the black matrix 76*a* blocks the light up to the position of width 76*h*1*b* illustrated in FIG. 6 and hides the contact 90H and a half or more of the outermost slit Sw, a change rate of a transmittance of the outermost slit Sw and that of the slit S can be made close to each other. If the black matrix 76*a* blocks the light up to the position of a width 76*h*1*c* illustrated in FIG. 6 and hides the contact 90H and the outermost slit Sw, a difference between the change rates of the transmittance of the outermost slit Sw and of the slit S does not have to be considered. These structures enable the luminance in the opening 76*b* to be made uniform.

Figure 7:
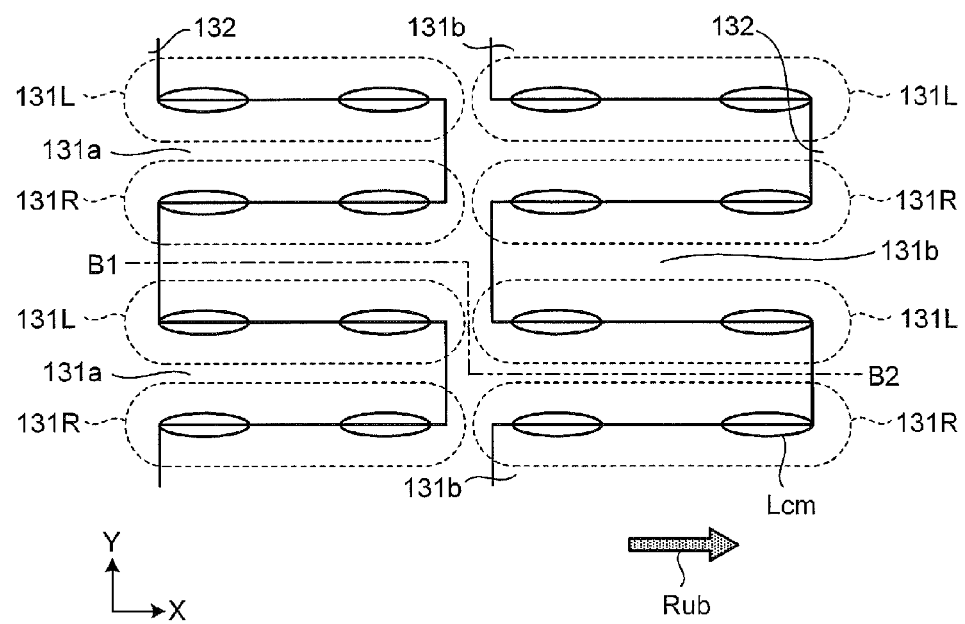
FIG. 7 is an explanatory diagram for explaining an orientation of the liquid crystal when a voltage for forming an electric field is not applied between the first electrode and the second electrode in the liquid crystal display device according to the first embodiment.
Figure 8:
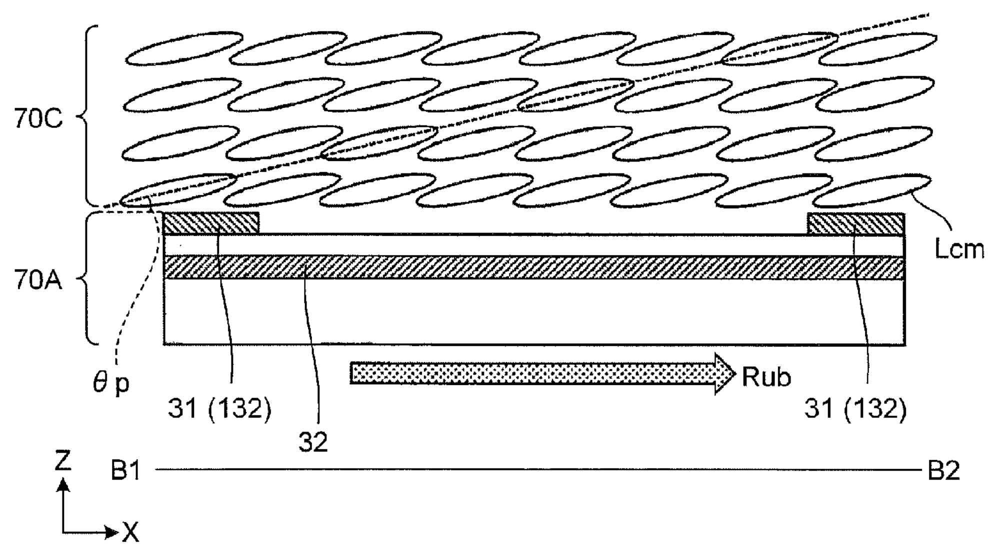
FIG. 8 is a schematic diagram of a cross section of line B1-B2 in FIG. 7.
Figure 9:
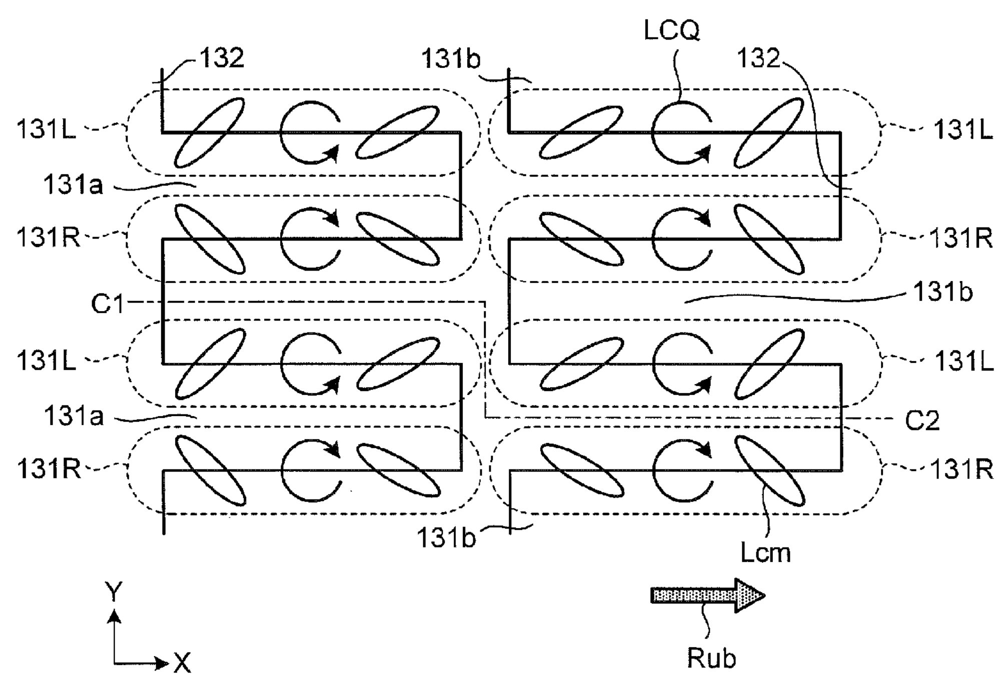
FIG. 9 is an explanatory diagram for explaining an orientation of the liquid crystal when a voltage for forming an electric field is applied between the first electrode and the second electrode in the liquid crystal display device according to the first embodiment.
Figure 10:
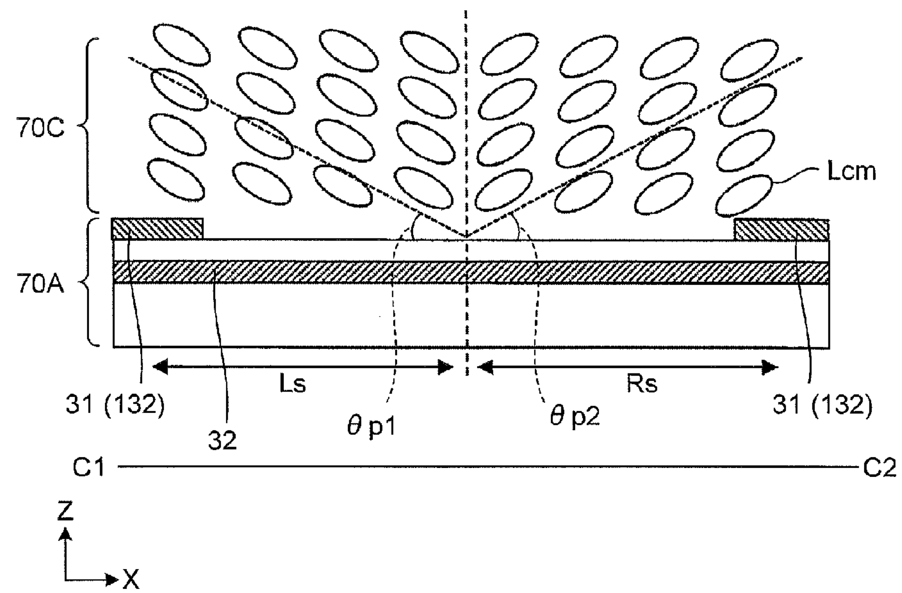
FIG. 10 is a schematic diagram of a cross section of line C1-C2 in FIG. 9.
Figure 11:
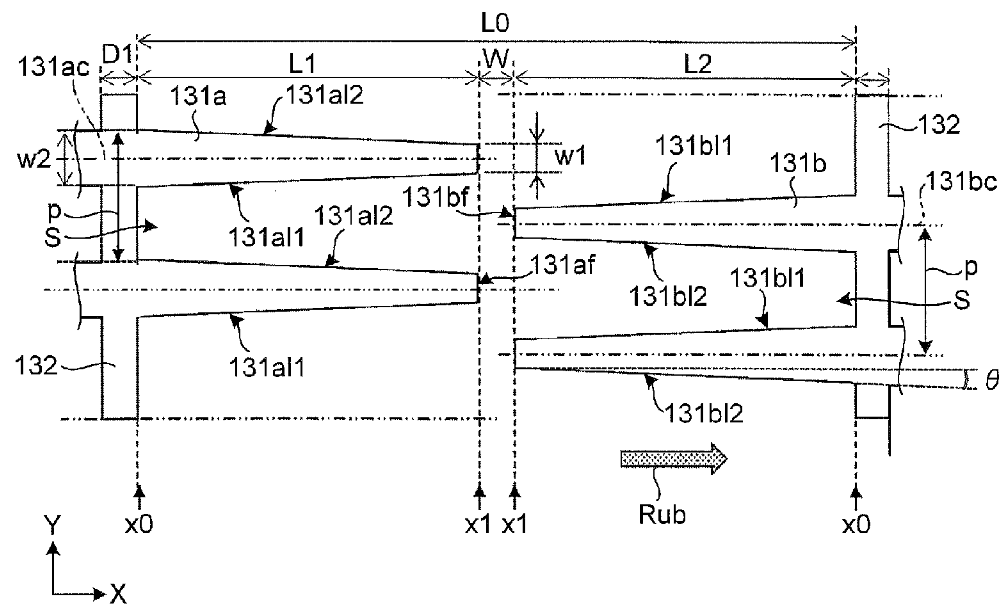
FIG. 11 is a schematic diagram for explaining in detail the shape of the first electrode according to the first embodiment.

FIG. 7 is an explanatory diagram for explaining an orientation of the liquid crystal when a voltage for generating an electric field between the first electrode and the second electrode is not applied therebetween in the liquid crystal display device according to the first embodiment. FIG. 8 is a schematic diagram of a cross section of line B1-B2 in FIG. 7. FIG. 9 is an explanatory diagram for explaining an orientation of the liquid crystal when a voltage for generating an electric field between the first electrode and the second electrode is applied therebetween in the liquid crystal display device according to the first embodiment. FIG. 10 is a schematic diagram of a cross section of line C1-C2 in FIG. 9. FIG. 11 is a schematic diagram for explaining in detail a shape of the first electrode according to the first embodiment.

As explained above, the first orientation film 73*a* is subjected to the rubbing process in the rubbing direction Rub illustrated in FIG. 3 and FIG. 5 so as to have the predetermined initial orientation characteristics in the X direction. Therefore, as illustrated in FIG. 7, when a voltage for generating an electric field between the first electrode 31 and the second electrode 32 is not applied therebetween, long-axis directions of liquid crystal molecules Lcm in the liquid crystal layer 70C are likely to be aligned in parallel to the extending directions of the comb-shaped portion 131*a* and the comb-shaped portion 131*b*. Therefore, the liquid crystal molecules Lcm are initially oriented along a direction parallel to the extending directions of the comb-shaped portion 131*a* and the comb-shaped portion 131*b* in areas near a right long side 131R and a left long side 131L of the comb-shaped portion 131*a* and the comb-shaped portion 131*b*, respectively, which face each other in a width direction of the slit S. Furthermore, the liquid crystal molecules Lcm illustrated in FIG. 8 are aligned along the rubbing direction Rub and are initially oriented upward toward the rubbing direction Rub so as to have a pre-tilt angle θp with respect to the surface of the TFT substrate 71.

As illustrated in FIG. 9, when a voltage for generating an electric field between the first electrode 31 and the second electrode 32 is applied therebetween, the liquid crystal molecules Lcm rotate in liquid crystal rotation directions LCQ. In other words, the liquid crystal rotation direction LCQ indicates a direction of twisting or of rotating the liquid crystal on an X-Y plane. The liquid crystal molecules Lcm in the area near the right long side 131R and in the area near the left long side 131L undergo electric fields opposite to each other to easily rotate in opposite directions.

In this way, in the liquid crystal layer 70C of the display device 1 according to the first embodiment, when a voltage is applied between the first electrode 31 and the second electrode 32, the liquid crystal molecules Lcm rotate in opposite directions to each other in the area near the right long side 131R being one side of the adjacent comb-shaped portions 131*a* (131*b*) that face each other in the width direction of the slit S and in the area near the left long side 131L being the other side thereof. Therefore, as compared with the display device in the FFS mode described in JP-A-2008-52161, in the display device 1 according to the first embodiment, the liquid crystal molecules Lcm react more quickly to the change in the electric field between the first electrode 31 and the second electrode 32. Accordingly, the display device 1 according to the first embodiment achieves an improved response speed.

The response speed is a speed at which a transmittance of the liquid crystal is shifted between predetermined levels when the voltage is applied between the first electrode 31 and the second electrode 32. In other words, the response speed is defined by a time required for transition from the state in which the voltage is not applied (e.g., transmittance=0) to the state in which the voltage is applied (transmittance=1) or required for its reverse transition.

When a voltage for generating an electric field between the first electrode 31 and the second electrode 32 is applied therebetween, the long-axis directions of the liquid crystal molecules Lcm also change in the Z direction, as illustrated in FIG. 10, while rotating within a plane (X-Y plane) parallel to the surface of the pixel substrate 70A (TFT substrate 71). The first electrode 31 and the second electrode 32 are arranged opposite to each other in a direction perpendicular to the surface of the pixel substrate 70A (TFT substrate 71), and therefore the electric field generated between the first electrode 31 and the second electrode 32 becomes a fringe electric field that passes through the slit S. The fringe electric field causes the long axes of the liquid crystal molecules Lcm to rise in the direction perpendicular (Z direction) to the surface of the pixel substrate 70A (TFT substrate 71) while rotating in liquid crystal rotation directions LCQ (clockwise rotation, counterclockwise rotation) on the X-Y plane illustrated in FIG. 9. The orientations of the liquid crystal rotation directions LCQ may be mixed in the center area of the slit S.

As illustrated in FIG. 10, the long-axis direction of the liquid crystal molecules Lcm is inclined by an angle θp2 that is greater than the pre-tilt angle θp in a slit area Rs between the comb-shaped portions 131*b*. In a slit area Ls between the comb-shaped portions 131*a*, the long-axis direction of the liquid crystal molecules Lcm is inclined by an angle θp1 in an opposite direction to the pre-tilt angle θp. The slit area Ls is harder for the long-axis direction of the liquid crystal molecules Lcm to rise therein than the slit area Rs, and is likely inferior in responsiveness.

As illustrated in FIG. 11, the display device 1 according to the first embodiment more finely defines the shape of the first electrode 31 to thereby improve the responsiveness. For example, as illustrated in FIG. 11, a total slit length between the electrode base portions 132 in the X direction is set as L0. A comb protruded length of the comb-shaped portion 131*a* in the X direction is set as L1. The comb protruded length L1 is a length from a position x1 of a tip 131*af* of the comb-shaped portion 131*a* to a protrusion start position x0 of the electrode base portion 132. Likewise, a comb protruded length of the comb-shaped portion 131*b* in the X direction is set as L2. The comb protruded length L2 is a length from a position x1 of a tip 131*bf* of the comb-shaped portion 131*b* to the protrusion start position x0 of the electrode base portion 132. Each width in the Y direction of the tip 131*af* of the comb-shaped portion 131*a* and of the tip 131*bf* of the comb-shaped portion 131*b* is set as w1. The total slit length L0 is preferably, for example, 10 μm to 60 μm. The total slit length L0 is more preferably less than 40 μm, for example, 20 μm. The display device 1 according to the first embodiment has higher orientation stability of the liquid crystal if the total slit length L0 is made shorter, and has higher luminance if the total slit length L0 is made longer.

As explained above, the slit area Ls illustrated in FIG. 10 is harder for the long-axis direction of the liquid crystal molecules Lcm to rise therein than the slit area Rs, and is likely inferior in responsiveness. To make the slit area Ls smaller than the slit area Rs, the comb protruded length L1 illustrated in FIG. 11 is made smaller than the comb protruded length L2 of the comb-shaped portion 131*b* on the downstream side in the rubbing direction Rub than the comb-shaped portion 131*a*. This enables the display device 1 according to the first embodiment to enhance the response speed.

The width w1 in the Y direction of the tip 131*af* of the comb-shaped portion 131*a* and of the tip 131*bf* of the comb-shaped portion 131*b* is set to, for example, 2 μm to 5 μm, and a narrower one allows further enhancement of the response speed.

An array pitch (slit pitch) p of adjacent comb-shaped portions 131*a* is the same as an array pitch p of adjacent comb-shaped portions 131*b*. Furthermore, the tip 131*af* of the comb-shaped portion 131*a* and the tip 131*bf* of the comb-shaped portion 131*b* are alternately arranged in the Y direction. With this structure, as illustrated in FIG. 9, the right long side 131R of the comb-shaped portion 131*a* and the right long side 131R of the comb-shaped portion 131*b* are aligned in the X direction. In addition, with this structure, as illustrated in FIG. 9, the left long side 131L of the comb-shaped portion 131*a* and the left long side 131L of the comb-shaped portion 131*b* are aligned in the X direction. As a result, the liquid crystal rotation directions LCQ in which the liquid crystal molecules Lcm rotate are oriented toward the same direction when viewed in the X direction, and behaviors of the liquid crystal molecules Lcm that rotate are thereby stabilized. If the array pitch p is narrower, the response speed becomes higher, and therefore the array pitch p is preferably smaller than 9 μm.

A gap between the tip 131*af* of the comb-shaped portion 131*a* and the tip 131*bf* of the comb-shaped portion 131*b* illustrated in FIG. 11 is a width W in the X direction of a communicating opening that extends in the Y direction, and a narrower one is preferable. For example, the width W in the X direction of the communicating opening is equal to or less than 7 μm. The width W in the X direction of the communicating opening is more preferably equal to or less than 4 μm. The width W in the X direction of the communicating opening can be also set to 0 or less. For example, when W is 0, the tip 131*af* of the comb-shaped portion 131*a* and the tip 131*bf* of the comb-shaped portion 131*b* are aligned in line in the Y direction with a gap in the Y direction between the tips, and a plurality of slits S have such a form that the slits S are communicatively opened. Alternatively, when W is less than 0, the tip 131*af* of the comb-shaped portion 131*a* and the tip 131*bf* of the comb-shaped portion 131*b* have a form in which the tips enter into respective adjacent slits S in the X direction, in other words, the comb-shaped portion 131*a* and the comb-shaped portion 131*b* have a form in which both of them are alternately intruded into the adjacent slits.

The comb-shaped portion 131*a* has a width w2 in the Y direction at the protrusion start position x0 of the electrode base portion 132, which is wider than the width w1 in the Y direction of the tip 131*af* of the comb-shaped portion 131*a*. Therefore, the comb-shaped portion 131*a* is formed into a trapezoidal shape. Because of this, a long side 131*a*11 and a long side 131*a*12 of the comb-shaped portion 131*a* are oblique sides each of which is inclined by an angle θ with respect to an imaginary line 131*ac* (X direction along which the comb-shaped portion 131*a* extends) that passes through the center of the comb-shaped portion 131*a*. When the angle θ is greater than 0.5 degrees, the liquid crystal rotation directions LCQ in which the liquid crystal molecules Lcm rotate are easily regulated, and the behaviors of the liquid crystal molecules Lcm thereby stabilize.

Likewise, the comb-shaped portion 131*b* has a width w2 in the Y direction at the protrusion start position x0 of the electrode base portion 132, which is wider than the width w1 in the Y direction of the tip 131*bf* of the comb-shaped portion 131*b*. Therefore, the comb-shaped portion 131*b* is formed into a trapezoidal shape. Because of this, a long side 131*b*11 and a long side 131*b*12 of the comb-shaped portion 131*b* are oblique sides each of which is inclined by an angle θ with respect to an imaginary line 131*bc* (X direction along which the comb-shaped portion 131*b* extends) that passes through the center of the comb-shaped portion 131*b*. When the angle θ is greater than 0.5 degrees, the liquid crystal rotation directions LCQ in which the liquid crystal molecules Lcm rotate are easily regulated, and the behaviors of the liquid crystal molecules Lcm thereby stabilize. In this way, the display device 1 according to the first embodiment achieves high orientation stability because the liquid crystal rotation directions LCQ are regulated in the adjacent columns in the X direction and along the line in the X direction.

The electrode base portion 132 does not contribute to light transmission, and therefore a width D1 of the electrode base portion 132 in the X direction (direction perpendicular to the extending direction of the electrode base portion 132) is preferably narrow. However, the electrode base portion 132 is structured such that a plurality of comb-shaped portions 131*a* and comb-shaped portions 131*b* protrude from both sides of the electrode base portion 132. Therefore, when the electrode base portion 132 is formed simultaneously with the comb-shaped portions 131*a* and the comb-shaped portions 131*b*, the width D1 in the X direction of the electrode base portion 132 is easy to become larger than the width w2 due to wraparound of exposure light. Especially, when the electrode base portion 132 is formed of the translucent electrode made of a translucent conductive material (translucent conductive oxide) such as ITO as well as the comb-shaped portion 131*a* or the comb-shaped portion 131*b*, the width D1 in the X direction of the electrode base portion 132 is easy to become larger than the width w2 due to wraparound of exposure light.

Figure 12:
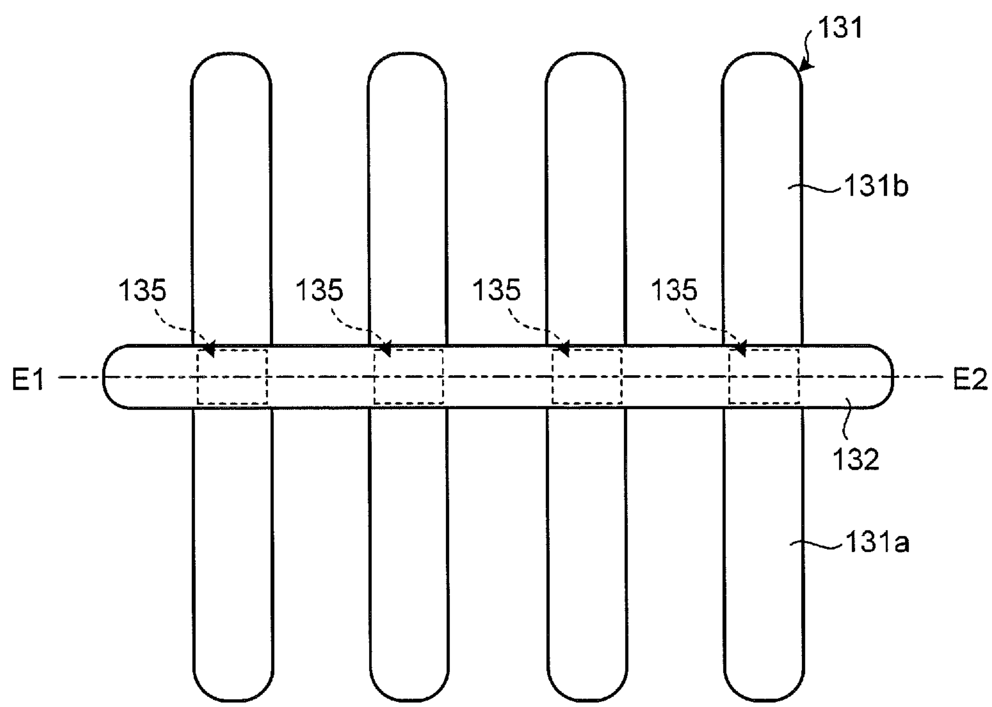
FIG. 12 is a schematic diagram for explaining in detail the first electrode according to the first embodiment.
Figure 13:
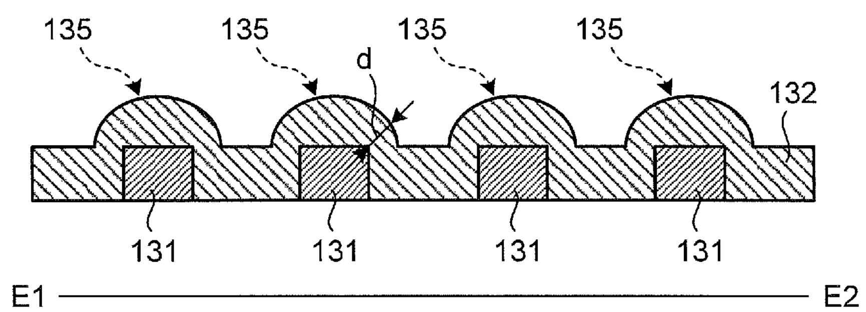
FIG. 13 is a schematic diagram of a cross section of line E1-E2 in FIG. 12.

FIG. 12 is a schematic diagram for explaining in detail the first electrode according to the first embodiment. FIG. 13 is a schematic diagram of a cross section of line E1-E2 in FIG. 12. As illustrated in FIG. 12 and FIG. 13, the comb-shaped portion 131 (the comb-shaped portion 131*a* and the comb-shaped portion 131*b*) according to the first embodiment has a coupling portion 135 layered under the electrode base portion 132. With this structure, a layer where the comb-shaped portion 131*a* and the comb-shaped portion 131*b* are formed by being exposed and a layer where the electrode base portion 132 is formed by being exposed are not formed at one time. Therefore, less influence of the exposure light for exposing the comb-shaped portion 131*a* and the comb-shaped portion 131*b* upon its formation is exerted on the formation of the electrode base portion 132, and the width D1 in the X direction of the electrode base portion 132 can be thereby reduced even to the width w2 or less. Accordingly, the display device 1 according to the first embodiment is capable of improving a response speed and reducing light transmission loss due to the first electrode 31.

The electrode base portion 132 is preferably formed of a conductive metal material different from the translucent conductive material (translucent conductive oxide) such as ITO, unlike the comb-shaped portion 131*a* and the comb-shaped portion 131*b*. As the conductive metal material, for example, aluminum (Al) and molybdenum (Mo) can be used. When the electrode base portion 132 is formed of the metal material, electrical resistance of the electrode base portion 132 lowers, so that the width w2 can be made thin. Moreover, when the electrode base portion 132 is formed of the metal material, a dry etching process capable of making thin the electrode base portion 132 can be easily applied thereto. Therefore, when the electrode base portion 132 is the metal material, line thinning is facilitated.

Figure 14:
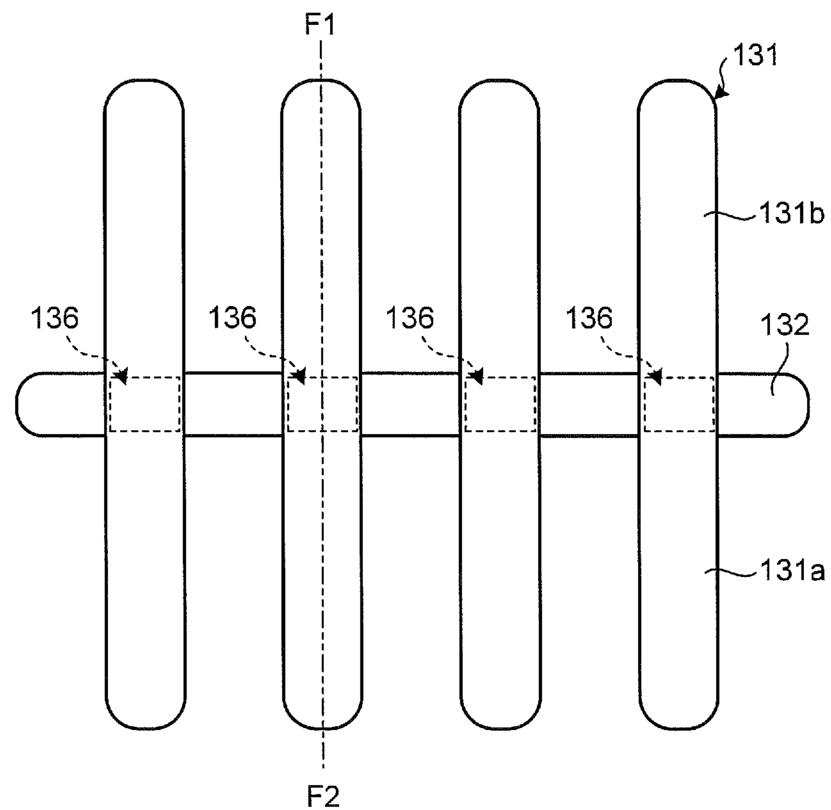
FIG. 14 is a schematic diagram for explaining in detail a modification of the first electrode according to the first embodiment.
Figure 15:
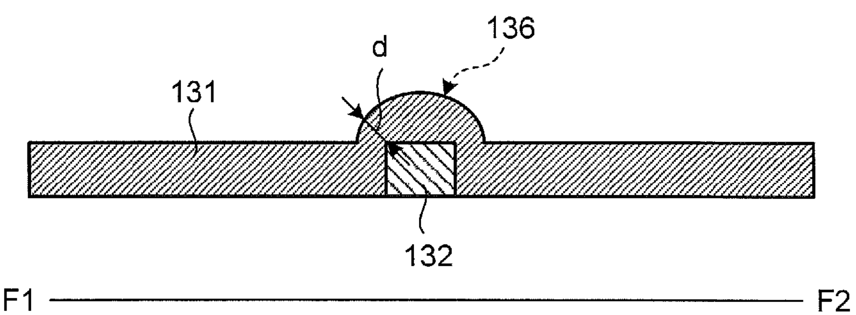
FIG. 15 is a schematic diagram of a cross section of line F1-F2 in FIG. 14.

As illustrated in FIG. 13, it is difficult to form the electrode base portion 132 on corners of the comb-shaped portion 131 near the coupling portion 135, and a thickness d of the upper layer is likely to become thinner. If the thickness d is small, the possibility of disconnection will occur. When the electrode base portion 132 is disconnected, it is quite possible that the disconnection is also simultaneously affected on the comb-shaped portions 131*a* and on the comb-shaped portions 131*b* connected to the electrode base portion 132. Therefore, the first electrode 31 according to the first embodiment may be structured like a modification illustrated in FIG. 14 and FIG. 15. FIG. 14 is a schematic diagram for explaining in detail a modification of the first electrode according to the first embodiment. FIG. 15 is a schematic diagram of a cross section of line F1-F2 in FIG. 14.

As illustrated in FIG. 14 and FIG. 15, the comb-shaped portion 131 (the comb-shaped portion 131*a* and the comb-shaped portion 131*b*) according to the modification of the first embodiment has a coupling portion 136 layered on the electrode base portion 132. With this structure, a layer where the comb-shaped portion 131*a* and the comb-shaped portion 131*b* are formed by being exposed and a layer where the electrode base portion 132 is formed by being exposed are not formed at one time. Therefore, less influence of the exposure light for exposing the comb-shaped portion 131*a* and the comb-shaped portion 131*b* is exerted on the formation of the electrode base portion 132, and the width D1 in the X direction of the electrode base portion 132 can also be reduced to the width w2 or less.

It is difficult to form the comb-shaped portion 131 on corners of the electrode base portion 132 near the coupling portion 136, and a thickness d of the upper layer is likely to become thinner. If the thickness d is small, the possibility of disconnection will occur. When the comb-shaped portion 131 is disconnected, the comb-shaped portions 131*a* and the comb-shaped portions 131*b* affected by the disconnection are limited as compared with the case where the electrode base portion 132 is disconnected.

The electrode base portion 132 is preferably formed of a metal material different from the translucent conductive material (translucent conductive oxide) such as ITO, unlike the comb-shaped portion 131*a* and the comb-shaped portion 131*b*. As the metal material, the above-mentioned materials can be used. When the electrode base portion 132 is formed of the metal material, electrical resistance of the electrode base portion 132 lowers, so that the width w2 can be made thin. Moreover, when the electrode base portion 132 is formed of the metal material, a dry etching process capable of making thin the electrode base portion 132 can be easily applied thereto. Therefore, when the electrode base portion 132 is the metal material, line thinning is facilitated.

Manufacturing Method

A method of manufacturing the display device 1 according to the first embodiment includes, for example, the following processes. A manufacturing system processes a first substrate preparing step of preparing a glass substrate being a translucent substrate as the TFT substrate 71 of the pixel substrate (first substrate) 70A.

Subsequently, the manufacturing system forms the scan line 24*m* and the gate electrode 93 on the TFT substrate 71. The manufacturing system then forms the insulating film 741 to be located between the scan line 24*m*/the gate electrode 93 and the semiconductor layer 92 over the TFT substrate 71. Then the manufacturing system forms layers such as the source electrode 91, the drain electrode 90, and the semiconductor layer 92. The manufacturing system forms the insulating film 742 to be located between the semiconductor layer 92 and the data line 25*n*. The manufacturing system forms the data line 25*n* and couples the data line 25*n* to the source electrode 91. The manufacturing system then forms the insulating film 743 to be located between the data line 25*n* and the second electrode 32.

Subsequently, the manufacturing system forms the second electrode 32 being the pixel electrode by sputtering, etching, or so, and couples the drain electrode 90 and the second electrode 32 via the conductive contact 90H. The thickness of the second electrode 32 is, for example, 10 nm to 100 nm. The manufacturing system then forms the insulating film 744 on the second electrode 32 using a plasma chemical vacuum deposition (CVD) method or the like.

The manufacturing system forms the first electrode 31 being the common electrode COM by sputtering, etching, or so. The thickness of the first electrode 31 is, for example, 10 nm to 100 nm. As illustrated in FIG. 13, the manufacturing system first forms the comb-shaped portion 131 of the first electrode 31 and then forms the electrode base portion 132. Alternatively, as illustrated in FIG. 15, the manufacturing system first forms the electrode base portion 132 of the first electrode 31 and then forms the comb-shaped portion 131. The first electrode 31 is formed into a comb shape by the slits S. The manufacturing system forms the first orientation film 73*a*, on the first electrode 31, in which a polymeric material such as polyimide is subjected to a process in the rubbing direction Rub. In this manner, the manufacturing system processes a first substrate manufacturing step.

The manufacturing system processes a second substrate preparing step of preparing a glass substrate being a translucent substrate as the glass substrate 72 of the counter substrate (second substrate) 70B.

The manufacturing system forms the layer including the color filters 76R, 76G, and 76B, and the black matrix 76*a* on the glass substrate 72 and forms an overcoat layer or so on top of the layer. The manufacturing system forms the second orientation film 73*b*, on the overcoat layer, in which a polymeric material such as polyimide is subjected to a process in an antiparallel direction (opposite direction) to the rubbing direction Rub. In this manner, the manufacturing system processes a second substrate manufacturing step.

The manufacturing system causes the pixel substrate 70A and the counter substrate 70B to face each other, injects liquid crystal into between the two, and seals the liquid crystal by using a frame part to form the liquid crystal layer 700. A polarizer, a backlight, and the like are attached to the rear side of the pixel substrate 70A, and a polarizer and the like are attached to the front side of the counter substrate 70B. The driver IC 3 is coupled to an electrode edge of the frame part, and the display device 1 is thus manufactured.

In the first embodiment, the amorphous silicon (a-Si) is used as the semiconductor layer 92 forming the TFT element Tr; however, the embodiment is not limited thereto. Polysilicon (poly-Si) may be used as the semiconductor layer 92. Alternatively, other semiconductor materials (e.g., germanium (Ge)) may be used instead of silicon or any material obtained by adding other materials to silicon (e.g., silicon germanium (SiGe)) may be used. Furthermore, an oxide semiconductor material may be used as the semiconductor layer 92. As the oxide semiconductor material, for example, an oxide semiconductor material including indium (In) may be used.

In the first embodiment, the TFT element Tr is a bottom gate type TFT in which the gate electrode 93 is provided below the semiconductor layer 92. However, if possible, the TFT element Tr may use a structure of a top gate type TFT in which the gate electrode 93 is provided above the semiconductor layer 92.

First Modification of First Embodiment

Figure 16:
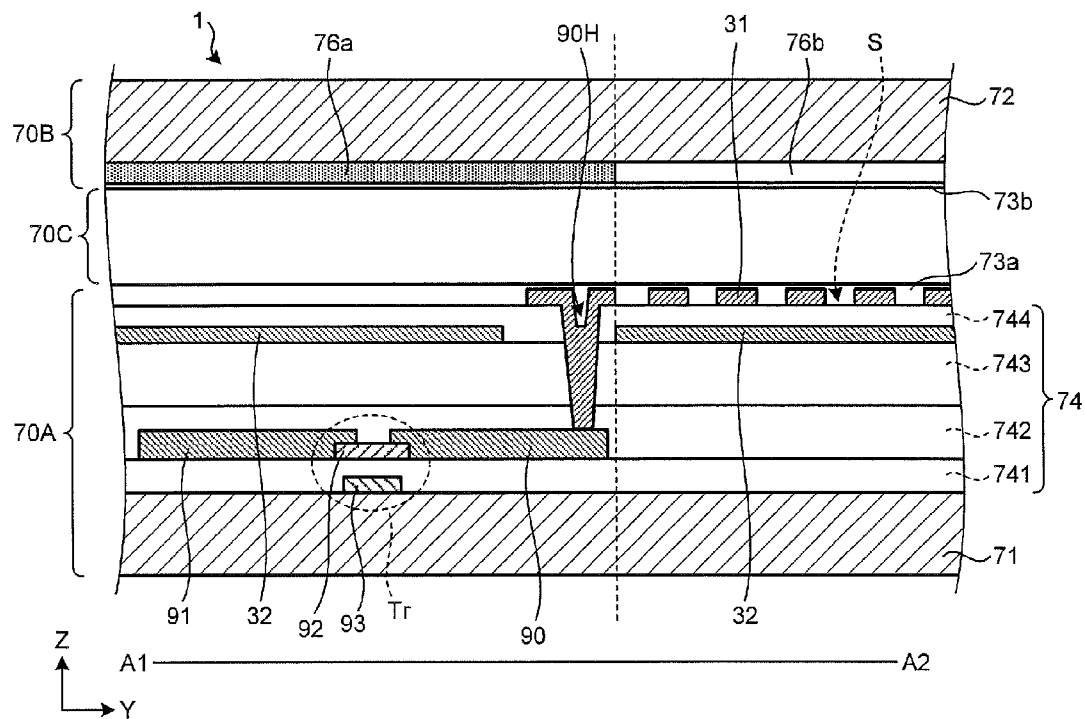
FIG. 16 is a schematic diagram of a modification of the cross section of line A1-A2 in FIG. 3.

A display device 1 according to a first modification of the first embodiment will be explained below. FIG. 16 is a schematic diagram of a modification of the cross section of line A1-A2 in FIG. 3. The same letters or numerals are assigned to the same components as these explained in the first embodiment, and overlapping explanation is therefore not repeated.

The display device 1 according to the first modification of the first embodiment is configured to generate an electric field (horizontal electric field) and in a direction parallel to the TFT substrate 71 between the first electrode 31 and the second electrode 32 which are layered in a direction (Z direction) perpendicular to the surface of the TFT substrate 71 of the pixel substrate 70A, to thereby rotate the liquid crystal molecules of the liquid crystal layer 70C in plane parallel to the substrate surface, and to perform display using a change in the light transmittance corresponding to the rotation of the liquid crystal molecules. For example, the second electrode 32 illustrated in FIG. 16 is the common electrode COM and the first electrode 31 is the pixel electrode. The first electrode 31 is coupled to the drain electrode 90 via, for example, the conductive contact 90H. The first electrode 31 has an independent pattern which is partitioned for each area of the pixel Vpix and is insulated from the first electrode 31 in the area of the adjacent pixel Vpix.

Second Modification of First Embodiment

Figure 17:
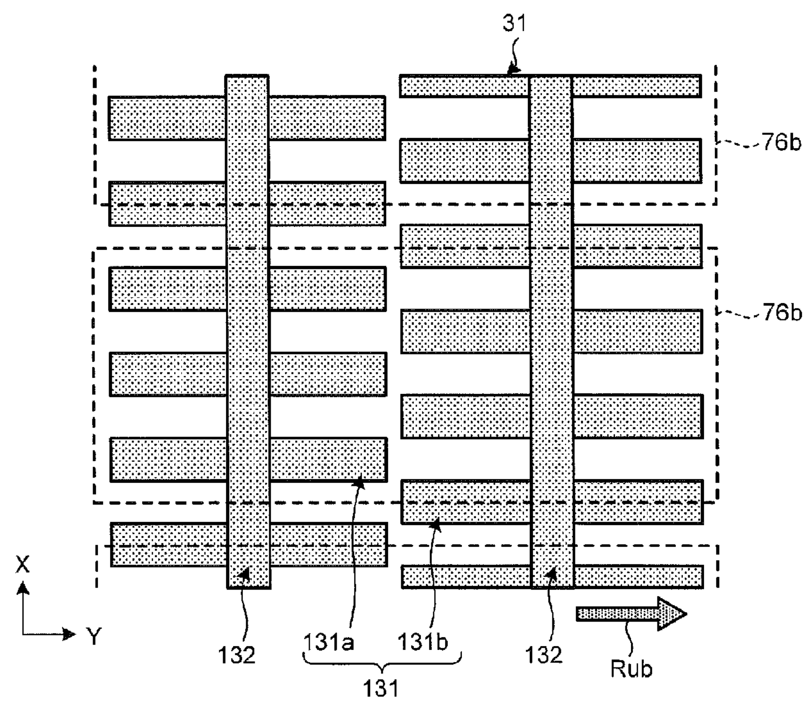
FIG. 17 is a schematic diagram for explaining a modification of the relation between the shape of the first electrode and the opening according to the first embodiment.

A display device 1 according to a second modification of the first embodiment will be explained below. FIG. 17 is a schematic diagram for explaining a modification of the relation between the shape of the first electrode and the opening according to the first embodiment. The same letters or numerals are assigned to the same components as these explained in the first embodiment, and overlapping explanation is therefore not repeated.

The first electrode 31 has the comb-shaped portions 131 protruding from the electrode base portion 132 that extends in the X direction. The comb-shaped portions 131 include the comb-shaped portions 131*a* and the comb-shaped portions 131*b* that extend from the electrode base portions 132 in opposite directions. A plurality of comb-shaped portions 131*a* protrude from each electrode base portion 132 at a fixed distance away from each other. Likewise, plurality of comb-shaped portions 131*b* protrude from each electrode base portion 132 at a fixed distance away from each other. From each electrode base portion 132, the comb-shaped portions 131*a* extend in the Y direction and the comb-shaped portions 131*b* extend in the opposite direction to the Y direction.

Therefore, the first orientation film 73*a* is subjected to the rubbing process in the rubbing direction Rub illustrated in FIG. 17 so as to have predetermined initial orientation characteristics in the Y direction. The second orientation film 73*b* is subjected to the rubbing process in an antiparallel direction to the rubbing direction Rub of the first orientation film 73*a*. The rubbing directions of the first orientation film 73*a* and the second orientation film 73*b* are antiparallel to each other. Further, the rubbing process may be replaced with other orientation process such as the photo-orientation process, as described above.

1-2. Second Embodiment

Figure 18:
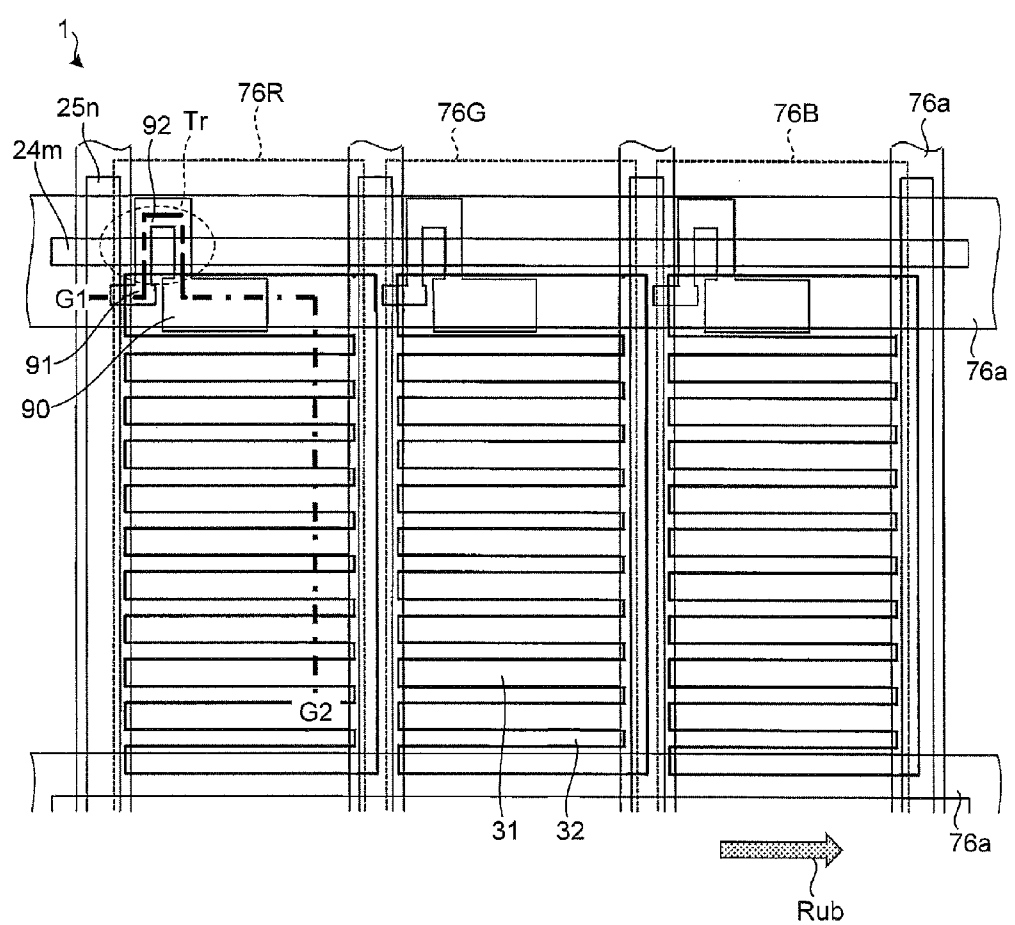
FIG. 18 is a plan view for explaining pixels of a liquid crystal display device according to a second embodiment.
Figure 19:
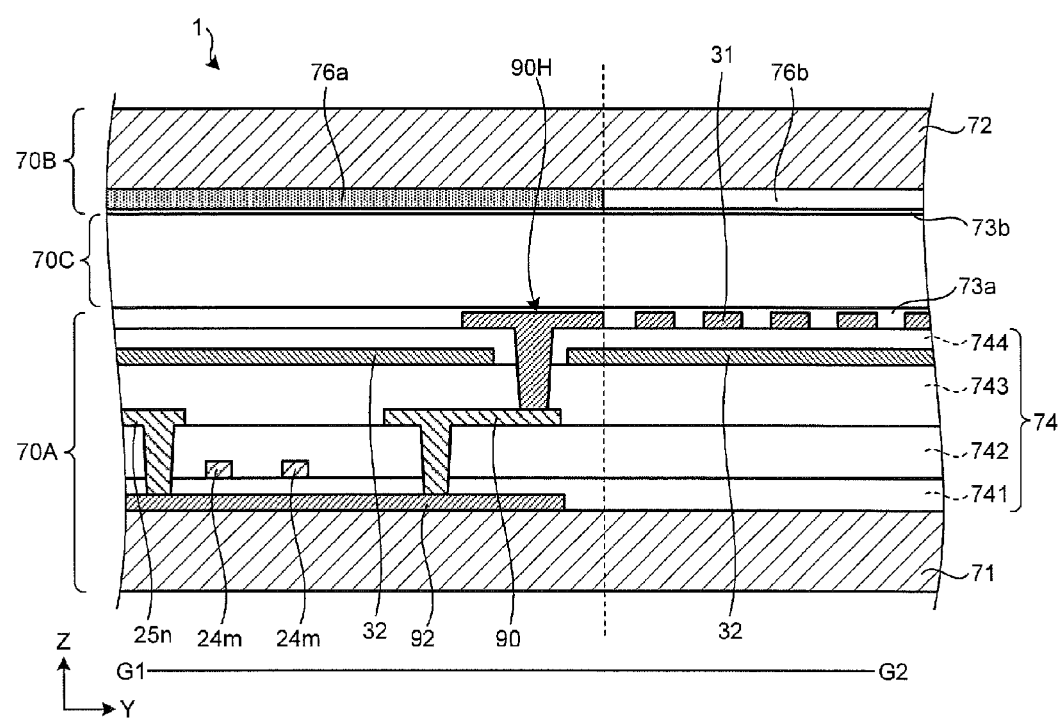
FIG. 19 is a schematic diagram of a cross section of line G1-G2 in FIG. 18.
Figure 20:
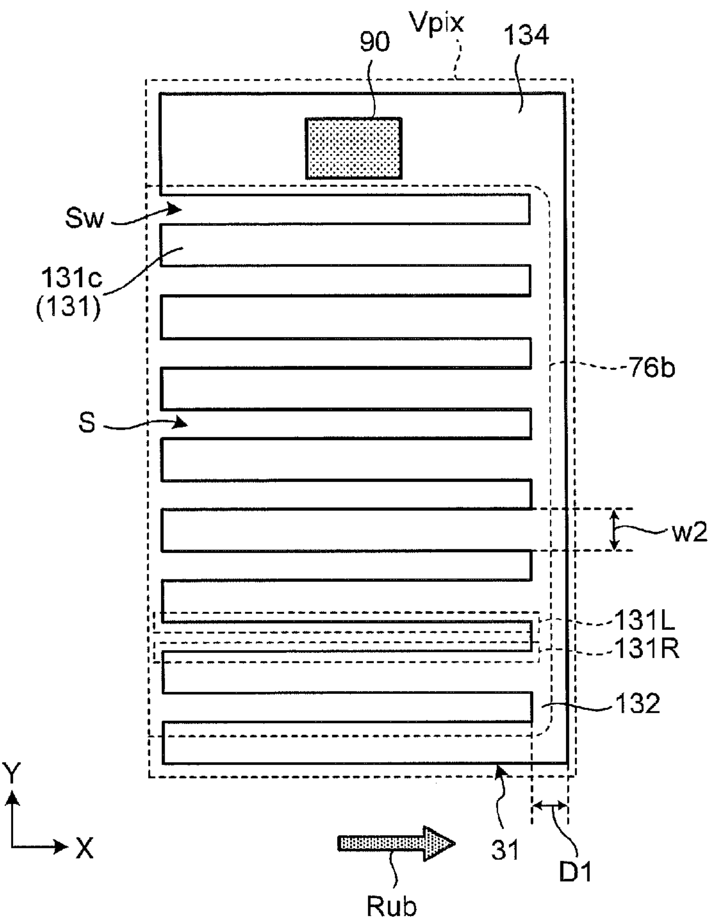
FIG. 20 is a schematic diagram for explaining a relation between a shape of a first electrode and an opening according to the second embodiment.

A display device 1 according to a second embodiment will be explained below. FIG. 18 is a plan view for explaining pixels of the display device according to the second embodiment. FIG. 19 is a schematic diagram of a cross section of line G1-G2 in FIG. 18. FIG. 20 is a schematic diagram for explaining a relation between a shape of a first electrode and an opening according to the second embodiment. The same letters or numerals are assigned to the same components as these explained in the first embodiment, and overlapping explanation is therefore not repeated.

As illustrated in FIG. 18, the semiconductor layer 92 is polysilicon (poly-Si) forming the TFT element Tr. The semiconductor layer 92 is a double-gate transistor forming channels in two areas.

As illustrated in FIG. 18 and FIG. 19, the display device 1 according to the second embodiment is configured to form an electric field (horizontal electric field) in the direction parallel to the TFT substrate 71 between the first electrode 31 and the second electrode 32 which are layered in the direction (Z direction) perpendicular to the surface of the TFT substrate 71 of the pixel substrate 70A, to thereby rotate the liquid crystal molecules of the liquid crystal layer 70C in plane parallel to the substrate surface, and to perform display using the change in the light transmittance corresponding to the rotation of the liquid crystal molecules. For example, the second electrode 32 illustrated in FIG. 19 is the common electrode COM and the first electrode 31 is the pixel electrode. The first electrode 31 is coupled to, for example, the drain electrode 90. The first electrode 31 has an independent pattern which is partitioned for each area of the pixels Vpix and is insulated from the first electrode 31 in the area of the adjacent pixel Vpix.

As illustrated in FIG. 20, the first electrode 31 is formed into a comb shape by the slits S each of which is an area without the conductive material. The first electrode 31 has a plurality of comb-shaped portions 131 protruding from an electrode base portion 132 that extends in the Y direction. The comb-shaped portions 131 include comb-shaped portions 131*c* which extend from the electrode base portion 132 in one direction, unlike the first embodiment. A plurality of comb-shaped portions 131*c* protrude from the electrode base portion 132 at a fixed distance away from each other. From the electrode base portion 132, the comb-shaped portions 131*c* extend in the opposite direction to the X direction. The comb-shaped portions 131*c* may extend in the X direction.

The first orientation film 73*a* is subjected to the rubbing process in the rubbing direction Rub illustrated in FIG. 18 and FIG. 20 so as to have the predetermined initial orientation characteristics in the X direction. The second orientation film 73*b* is subjected to the rubbing process in the antiparallel direction to the rubbing direction Rub of the first orientation film 73*a*. The rubbing directions of the first orientation film 73*a* and the second orientation film 73*b* are antiparallel to each other. Further, the rubbing process may be replaced with other orientation process such as the photo-orientation process, as described above.

Figure 21:
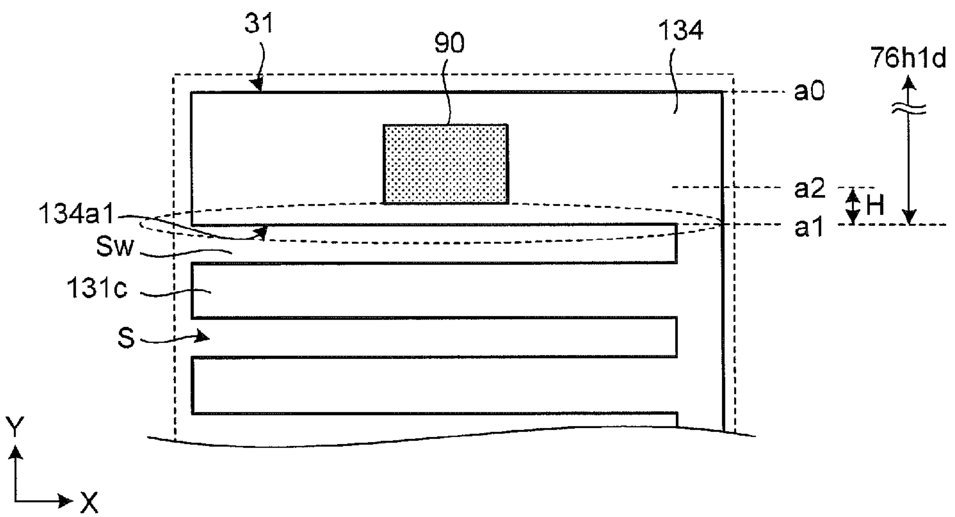
FIG. 21 is a schematic diagram for explaining a relation between the shape of the first electrode and a light blocking position according to the second embodiment.

FIG. 21 is a schematic diagram for explaining a relation between the shape of the first electrode and a light blocking position according to the second embodiment. The black matrix 76*a* has only to block the light up to a positional of a width 76*h*1*d* illustrated in FIG. 21 to hide the drain electrode 90. A comb-shaped portion 134 is arranged near an edge of the opening 76*b* and coupled to the drain electrode 90. An electric field applied to the outermost slit Sw, which is provided between a comb-shaped portion 134 and the comb-shaped portion 131*c* adjacent thereto, is different in distribution from an electric field applied to the slit S between adjacent comb-shaped portions 131*c*. Therefore, if the black matrix 76*a* blocks the light up to the position of the width 76*h*1*b* illustrated in FIG. 6 to hide an edge 134*a*1 of the comb-shaped portion 134 so that the whole of the comb-shaped portion 134 is hidden, change rates of transmittances of the outermost slit Sw and of the slit S can be close to each other. If the black matrix 76*a* blocks the light from an outer peripheral edge a0 of the comb-shaped portion 134 to a position a2 of the drain electrode 90 to hide the drain electrode 90, at least degradation or non-uniformity of brightness can be reduced. This structure allows the luminance in the opening 76*b* to be uniform.

Similar to the display device 1 according to the first embodiment, in the liquid crystal layer 70C of the display device 1 according to the second embodiment, when a voltage is applied between the first electrode 31 and the second electrode 32, the liquid crystal molecules rotate in opposite directions to each other in the area near the right long side 131R being one side of the adjacent comb-shaped portions 131*c* that face each other in the width direction of the slit S and in the area near the left long side 131L being the other side thereof. Therefore, as compared with the display device in the FFS mode described in JP-A-2008-52161, in the display device 1 according to the second embodiment, the liquid crystal molecules quickly react to the change in the electric field between the first electrode 31 and the second electrode 32. Accordingly, the display device 1 according to the second embodiment achieves an improved response speed.

Figure 22:
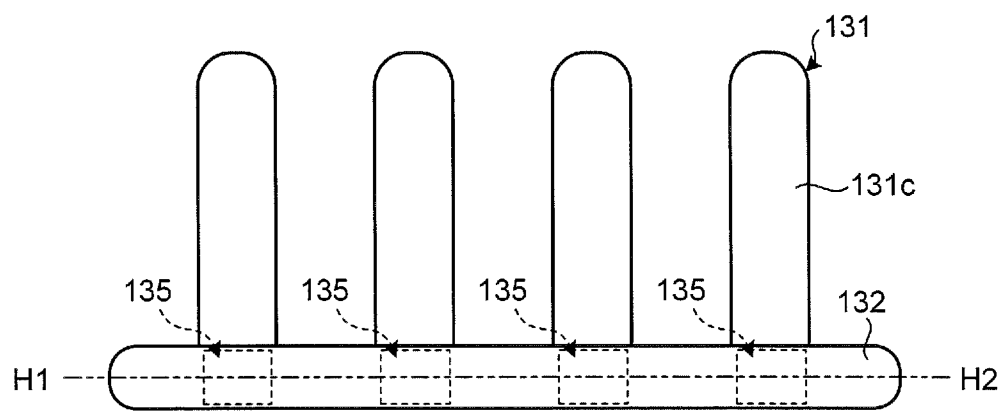
FIG. 22 is a schematic diagram for explaining in detail the first electrode according to the second embodiment.
Figure 23:
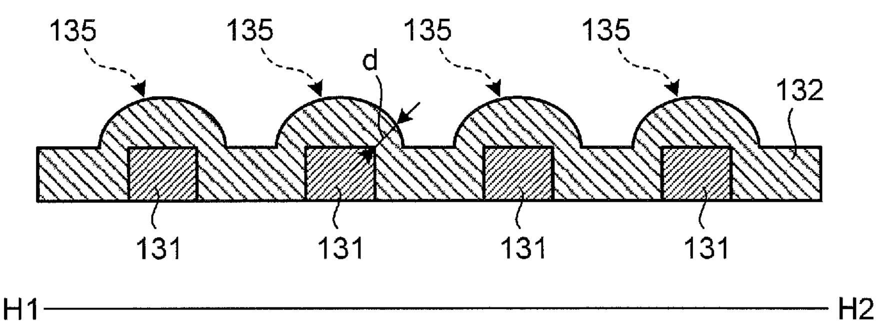
FIG. 23 is a schematic diagram of a cross section of line H1-H2 in FIG. 22.

FIG. 22 is a schematic diagram for explaining in detail the first electrode according to the second embodiment. FIG. 23 is a schematic diagram of a cross section of line H1-H2 in FIG. 22. As illustrated in FIG. 22 and FIG. 23, the comb-shaped portion 131 (the comb-shaped portion 131*c*) according to the second embodiment has the coupling portion 135 layered under the electrode base portion 132. With this structure, a layer where the comb-shaped portion 131*c* is formed by being exposed and a layer where the electrode base portion 132 is formed by being exposed are not formed at one time. Therefore, less influence of the exposure light for exposing the comb-shaped portion 131*c* is exerted on the formation of the electrode base portion 132, and the width D1 in the X direction of the electrode base portion 132 can be reduced even to the width w2 or less. The display device 1 according to the second embodiment is capable of improving the response speed and reducing the light transmission loss due to the first electrode 31.

The electrode base portion 132 is preferably formed of a metal material different from the translucent conductive material (translucent conductive oxide) such as ITO, unlike the comb-shaped portion 131*c*. As the metal material, the materials can be used. When the electrode base portion 132 is formed of the metal material, electrical resistance of the electrode base portion 132 lowers, so that the width w2 can be made thin. Moreover, when the electrode base portion 132 is formed of the metal material, a dry etching process capable of making thin the electrode base portion 132 can be easily applied thereto. Therefore, when the electrode base portion 132 is the metal material, line thinning is facilitated.

Figure 24:
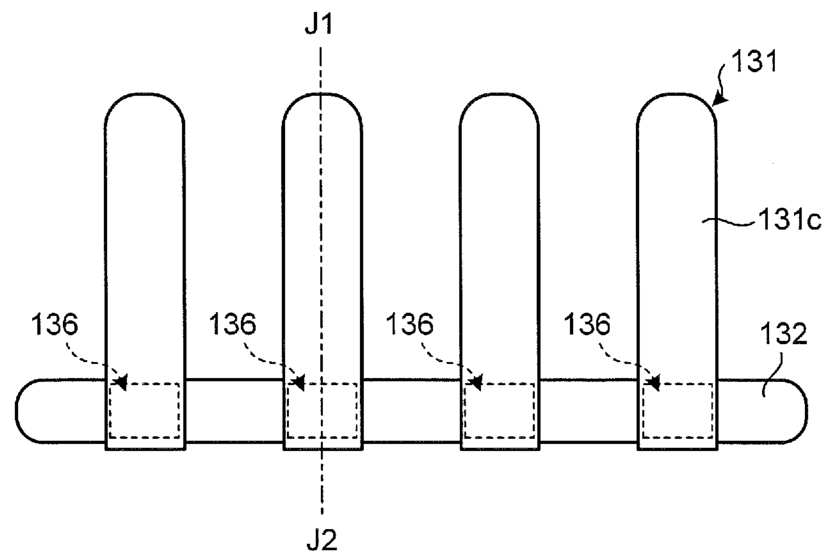
FIG. 24 is a schematic diagram for explaining in detail a modification of the first electrode according to the second embodiment.
Figure 25:
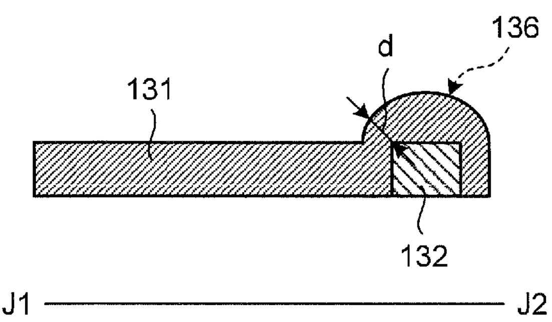
FIG. 25 is a schematic diagram of a cross section of line J1-J2 in FIG. 24.

As illustrated in FIG. 23, it is difficult to form the electrode base portion 132 on corners of the comb-shaped portion 131 near the coupling portion 135, and a thickness d of the upper layer is likely to become thinner. If the thickness d is small, the possibility of disconnection will occur. When the electrode base portion 132 is disconnected, it is quite possible that the disconnection is also simultaneously affected on the first comb-shaped portions 131*c* connected to the electrode base portion 132. Therefore, the first electrode 31 according to the second embodiment may be structured like a modification illustrated in FIG. 24 and FIG. 25. FIG. 24 is a schematic diagram for explaining in detail a modification of the first electrode according to the second embodiment. FIG. 25 is a schematic diagram of a cross section of line J1-J2 in FIG. 24.

As illustrated in FIG. 24 and FIG. 25, the comb-shaped portion 131 (comb-shaped portion 131*c*) according to the modification of the second embodiment has a coupling portion 136 layered on the electrode base portion 132. With this structure, a layer where the comb-shaped portion 131*c* is formed by being exposed and a layer where the electrode base portion 132 is formed by being exposed are not formed at onetime. Therefore, less influence of the exposure light for exposing the comb-shaped portion 131*c* is exerted on the formation of the electrode base portion 132, and the width D1 in the X direction of the electrode base portion 132 can also be reduced to the width w2 or less.

It is difficult to form the comb-shaped portion 131 on the corners of the electrode base portion 132 near the coupling portion 136, and a thickness d of the upper layer is likely to become thinner. If the thickness d is small, the possibility of disconnection will occur. When the comb-shaped portion 131 is disconnected, the comb-shaped portions 131*c* affected by the disconnection are limited as compared with the case where the electrode base portion 132 is disconnected.

The electrode base portion 132 is preferably formed of a metal material different from the translucent conductive material (translucent conductive oxide) such as ITO, unlike the comb-shaped portion 131*c*. As the metal material, the above-mentioned materials can be used. When the electrode base portion 132 is formed of the metal material, electrical resistance of the electrode base portion 132 lowers, so that the width w2 can be made thin. Moreover, when the electrode base portion 132 is formed of the metal material, a dry etching process capable of making thin the electrode base portion 132 can be easily applied thereto. Therefore, when the electrode base portion 132 is the metal material, line thinning is facilitated.

First Modification of Second Embodiment

Figure 26:
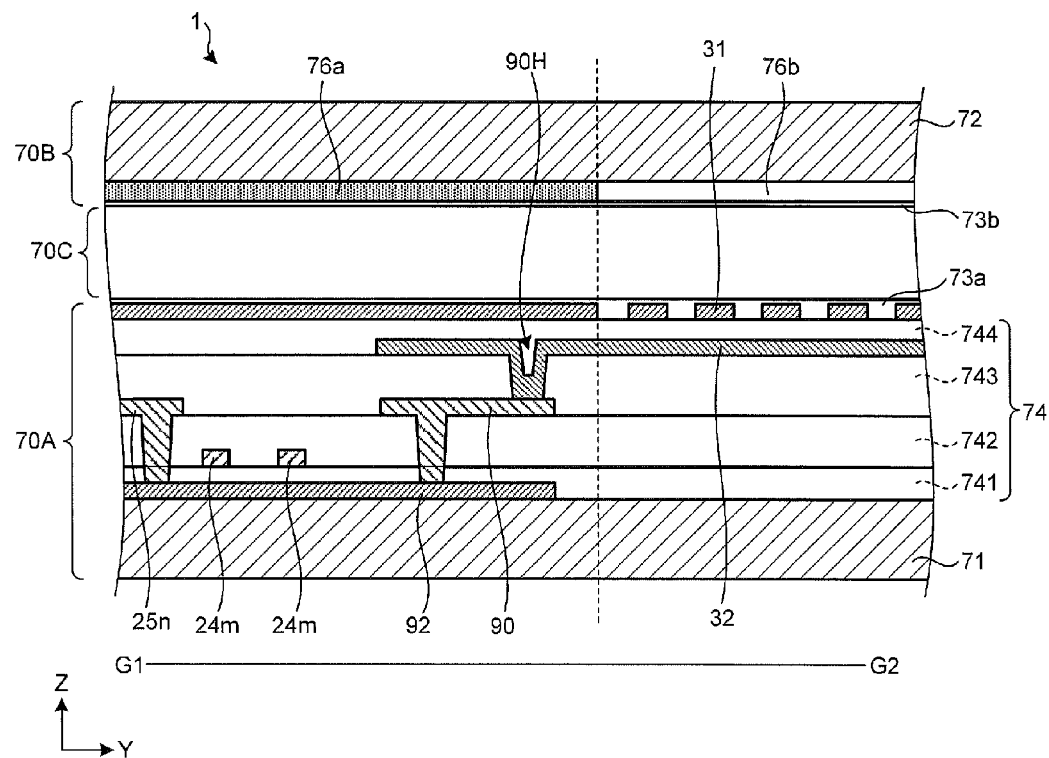
FIG. 26 is a schematic diagram of a modification of the cross section of line G1-G2 in FIG. 18.

A display device 1 according to a first modification of the second embodiment will be explained below. FIG. 26 is a schematic diagram of a modification of the cross section of line G1-G2 in FIG. 18. The same letters or numerals are assigned to the same components as these explained in the first embodiment and the second embodiment, and overlapping explanation is therefore not repeated.

The display device 1 according to the first modification of the second embodiment is configured to form an electric field (horizontal electric field) in the direction parallel to the TFT substrate 71 between the first electrode 31 and the second electrode 32 which are layered in the direction (Z direction) perpendicular to the surface of the TFT substrate 71 of the pixel substrate 70A, to thereby rotate the liquid crystal molecules of the liquid crystal layer 70C in plane parallel to the substrate surface, and to perform display using the change in the light transmittance corresponding to the rotation of the liquid crystal molecules. For example, the first electrode 31 illustrated in FIG. 26 is the common electrode COM, and the second electrode 32 is the pixel electrode. The second electrode 32 is coupled to the drain electrode 90 via, for example, the conductive contact 90H.

Second Modification of Second Embodiment

Figure 27:
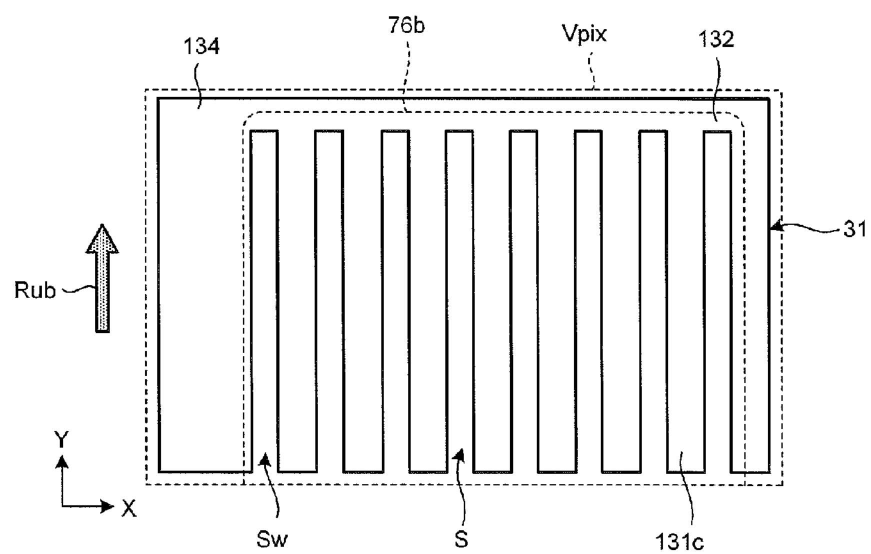
FIG. 27 is a schematic diagram for explaining a modification of the relation between the shape of the first electrode and the opening according to the second embodiment.

A display device 1 according to a second modification of the second embodiment will be explained below. FIG. 27 is a schematic diagram for explaining a modification of the relation between the shape of the first electrode and the opening according to the second embodiment. The same letters or numerals are assigned to the same components as these explained in the first embodiment and the second embodiment, and overlapping explanation is therefore not repeated.

The first electrode 31 has the comb-shaped portions 131 protruding from an electrode base portion 132 that extends in the X direction. The comb-shaped portions 131 include the comb-shaped portions 131*c* that extend from the electrode base portion 132 in the opposite directions to the Y direction. A plurality of comb-shaped portions 131*c* protrude from the electrode base portion 132 at a fixed distance away from each other. The comb-shaped portions 131*c* may extend in the Y direction.

Therefore, the first orientation film 73*a* is subjected to the rubbing process in the rubbing direction Rub illustrated in FIG. 27 so as to have the predetermined initial orientation characteristics in the Y direction. The second orientation film 73*b* is subjected to the rubbing process in the antiparallel direction to the rubbing direction Rub of the first orientation film 73*a*. The rubbing directions of the first orientation film 73*a* and the second orientation film 73*b* are antiparallel to each other. Further, the rubbing process may be replaced with other orientation process such as the photo-orientation process, as described above.

2. APPLICATION EXAMPLES

Application examples of the display device 1 as explained in the first and the second embodiments and the modifications thereof will be explained below with reference to FIG.

Figure 39:
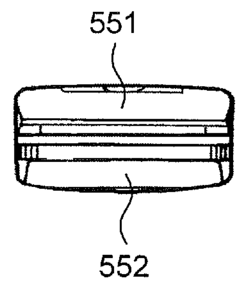
FIG. 39 is a diagram of an example of the electronic apparatus to which the liquid crystal display device according to one of the embodiments or the modifications thereof is applied.
Figure 40:
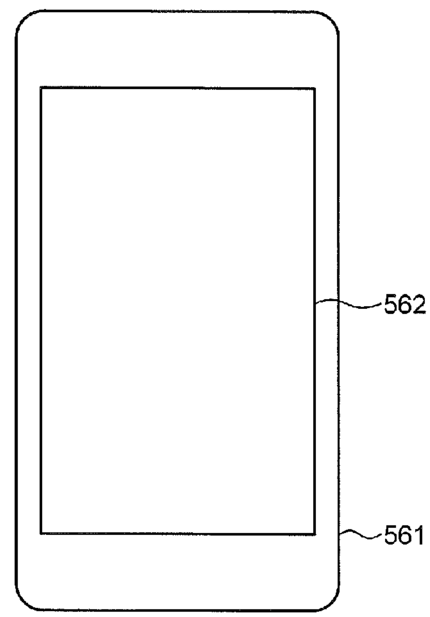
FIG. 40 is a diagram of an example of an electronic apparatus to which the liquid crystal display device according to one of the embodiments or the modifications thereof is applied.

28 to FIG. 40. FIG. 28 to FIG. 40 are diagrams of examples of an electronic apparatus to which the liquid crystal display device according to one of the embodiments or the modifications thereof is applied. The display device 1 according to one of the embodiments or the modifications thereof can be applied to electronic apparatuses in all areas such as portable electronic apparatuses such as mobile telephones and smartphones, television devices, digital cameras, notebook personal computers, video cameras, or indicators mounted on vehicles. In other words, the display device 1 according to one of the embodiments or the modifications thereof can be applied to electronic apparatuses in all areas that display an externally input video signal or an internally generated video signal as an image or a video. The electronic apparatuses include a control device that supplies a video signal to the display device 1 according to one of the embodiments or the modifications thereof and controls operations of the display device 1.

Application Example 1

Figure 28:
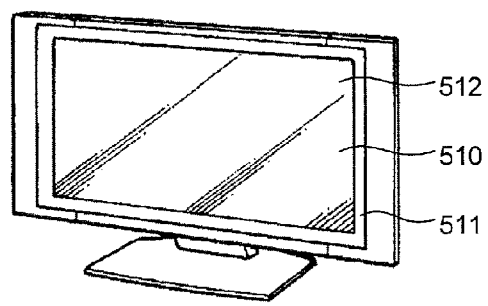
FIG. 28 is a diagram of an example of an electronic apparatus that applies the liquid crystal display device according to a present embodiment.

The electronic apparatus illustrated in FIG. 28 is a television device to which the display device 1 according to one of the embodiments or the modifications thereof is applied. Examples of the television device include, but are not limited to, a video display screen unit 510 including a front panel 511 and a filter glass 512. The video display screen unit 510 is the display device 1 according to one of the embodiments or the modifications thereof.

Application Example 2

Figure 29:
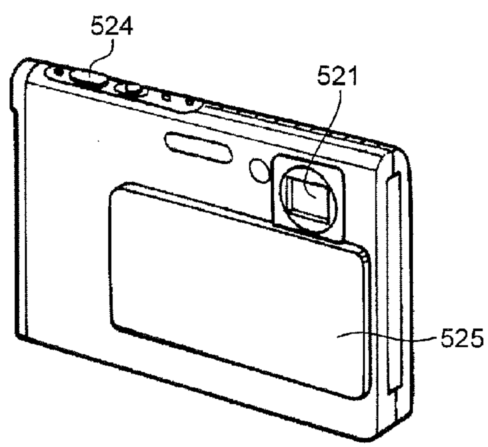
FIG. 29 is a diagram of an example of an electronic apparatus to which the liquid crystal display device according to one of the embodiments or the modifications thereof is applied.
Figure 30:
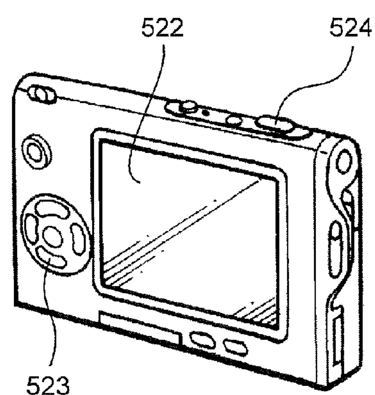
FIG. 30 is a diagram of an example of the electronic apparatus to which the liquid crystal display device according to one of the embodiments or the modifications thereof is applied.

The electronic apparatus illustrated in FIG. 29 and FIG. 30 is a digital camera to which the display device 1 according to one of the embodiments or the modifications thereof is applied. Examples of the digital camera include, but are not limited to, a light emitting unit 521 for a flash, a display unit 522, a menu switch 523, and a shutter button 524. The display unit 522 is the display device 1 according to one of the embodiments or the modifications thereof. As illustrated in FIG. 29, the digital camera has a lens cover 525, and by sliding the lens cover 525, a photographing lens comes out. The digital camera is capable of taking digital photos by capturing light incident through the photographing lens.

Application Example 3

Figure 31:
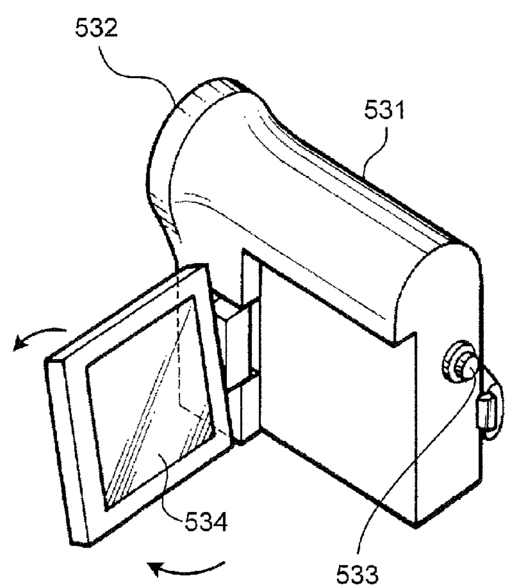
FIG. 31 is a diagram of an example of an electronic apparatus to which the liquid crystal display device according to one of the embodiments or the modifications thereof is applied.

The electronic apparatus illustrated in FIG. 31 represents an appearance of a video camera to which the display device 1 according to one of the embodiments or the modifications thereof is applied. Examples of the video camera include, but are not limited to, a main body 531, a lens 532 for photographing a subject provided on the front side face of the main body 531, a start/stop switch 533 in photographing, and a display unit 534. The display unit 534 is the display device 1 according to one of the embodiments or the modifications thereof.

Application Example 4

Figure 32:
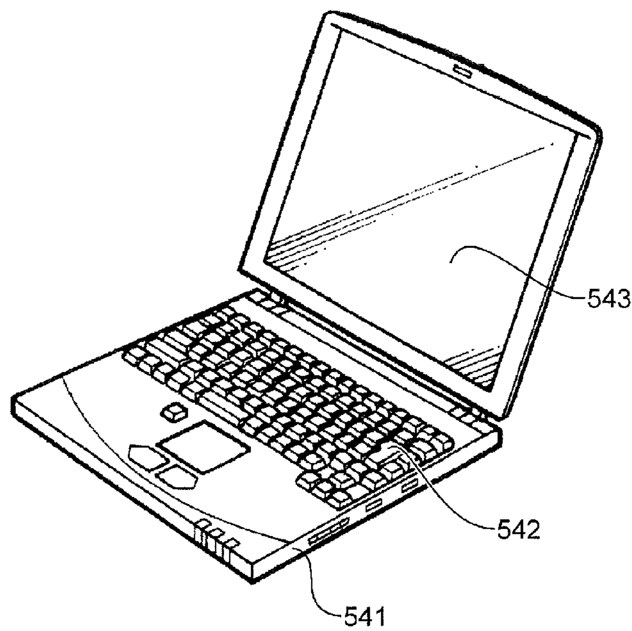
FIG. 32 is a diagram of an example of an electronic apparatus to which the liquid crystal display device according to one of the embodiments or the modifications thereof is applied.

The electronic apparatus illustrated in FIG. 32 is a notebook personal computer to which the display device 1 according to one of the embodiments or the modifications thereof is applied. Examples of the notebook personal computer include, but are not limited to, a main body 541, a keyboard 542 for performing an input operation of text and the like, and a display unit 543 that displays an image. The display unit 543 is the display device 1 according to one of the embodiments or the modifications thereof.

Application Example 5

Figure 33:
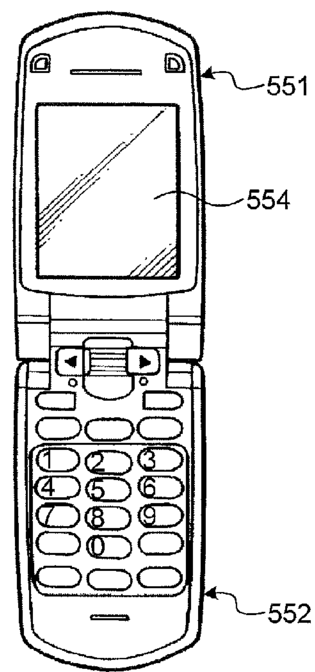
FIG. 33 is a diagram of an example of an electronic apparatus to which the liquid crystal display device according to one of the embodiments or the modifications thereof is applied.
Figure 34:
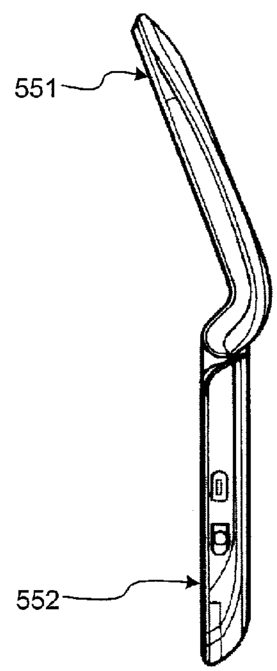
FIG. 34 is a diagram of an example of the electronic apparatus to which the liquid crystal display device according to one of the embodiments or the modifications thereof is applied.
Figure 35:
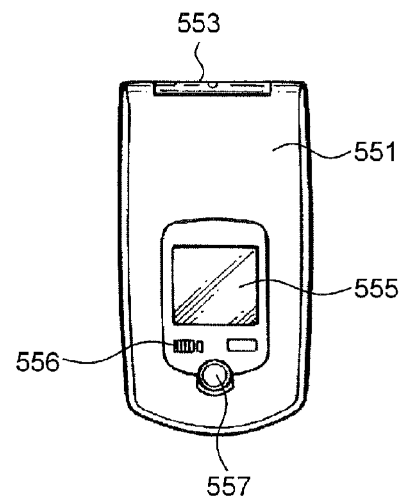
FIG. 35 is a diagram of an example of the electronic apparatus to which the liquid crystal display device according to one of the embodiments or the modifications thereof is applied.
Figure 36:
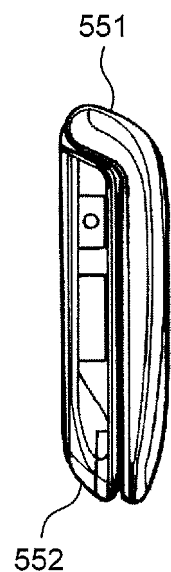
FIG. 36 is a diagram of an example of the electronic apparatus to which the liquid crystal display device according to one of the embodiments or the modifications thereof is applied.
Figure 37:
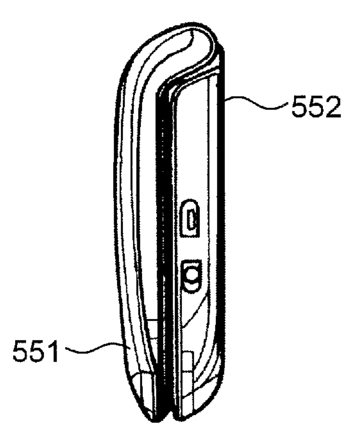
FIG. 37 is a diagram of an example of the electronic apparatus to which the liquid crystal display device according to one of the embodiments or the modifications thereof is applied.
Figure 38:
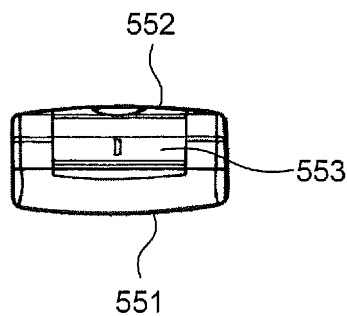
FIG. 38 is a diagram of an example of the electronic apparatus to which the liquid crystal display device according to one of the embodiments or the modifications thereof is applied.

The electronic apparatus illustrated in FIG. 33 to FIG. 39 is a mobile phone to which the display device 1 is applied. FIG. 33 is a front view of the mobile phone in its opened state, FIG. 34 is a right side view of the mobile phone in the opened state, FIG. 35 is a front view of the mobile phone in its folded state, FIG. 36 is a left side view of the mobile phone in the folded state, FIG. 37 is a right side view of the mobile phone in the folded state, FIG. 38 is a top view of the mobile phone in the folded state, and FIG. 39 is a bottom view of the mobile phone in the folded state. The mobile phone is the one that has, for example, an upper housing 551 and a lower housing 552 connected to each other with a connecting unit (hinge unit) 553, and that includes a display 554, a sub-display 555, a picture light 556, and a camera 557. The display device 1 is mounted on the display 554. Therefore, the display 554 of the mobile phone may have a function of detecting a touch operation in addition to a function of displaying images.

Application Example 6

The electronic apparatus illustrated in FIG. 40 is a portable information terminal that operates as a portable computer, a multifunctional mobile phone, a portable computer capable of performing voice communication, or as a portable computer capable of performing communication, and that is sometimes referred to as so-called a smartphone or a tablet terminal. The portable information terminal has a display unit 562 on the surface of, for example, a housing 561. The display unit 562 is the display device 1 according to one of the embodiments or the modifications thereof.

Application Example 7

Figure 41:
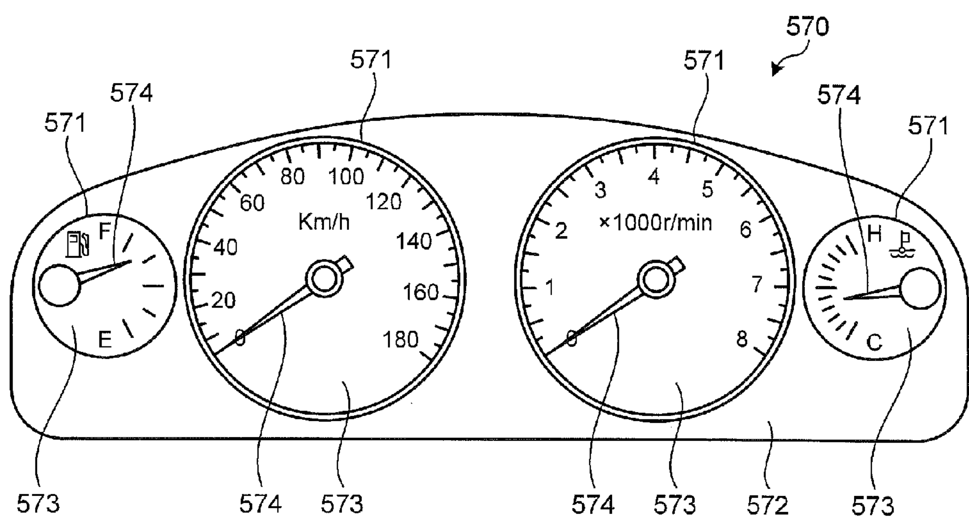
FIG. 41 is a diagram of an example of an electronic apparatus to which the liquid crystal display device according to one of the embodiments or the modifications thereof is applied.

FIG. 41 is a schematic configuration diagram of a meter unit according to one of the embodiments or the modifications thereof. The electronic apparatus illustrated in FIG. 41 is a meter unit mounted on vehicles. A meter unit (electronic apparatus) 570 illustrated in FIG. 41 includes a plurality of liquid crystal display devices 1 according to one of the embodiments or the modifications thereof such as a fuel meter, a water temperature meter, speed meter, and a tachometer as liquid crystal display devices 571. All the liquid crystal display devices 571 are covered with a piece of face panel 572.

Each of the liquid crystal display devices 571 illustrated in FIG. 41 is structured to combine a liquid crystal panel 573 as a liquid crystal displaying unit with a movement mechanism as an analog displaying unit. The movement mechanism includes a motor as a driving unit and an indicator 574 rotated by the motor. As illustrated in FIG. 41, each of the liquid crystal display devices 571 is capable of displaying scale marks, warning, or the like on the display surface of the liquid crystal panel 573 and also capable of rotating the indicator 574 of the movement mechanism on the display surface side of the liquid crystal panel 573.

FIG. 41 represents a structure with the liquid crystal display devices 571 provided in one piece of face panel 572; however, the embodiment is not limited thereto. A unit of liquid crystal display device 571 is provided in an area surrounded by the face panel 572, and the fuel meter, the water temperature meter, the speed meter, the tachometer, or so may be displayed on the liquid crystal display device 571.

3. ASPECTS OF PRESENT DISCLOSURE

The present disclosure includes aspects as follows.

(1) A liquid crystal display device comprising:

a first substrate and a second substrate that face each other;

a liquid crystal layer provided between the first substrate and the second substrate; and a first electrode and a second electrode provided between the first substrate and the liquid crystal layer, wherein the first electrode includes:

at least an electrode base portion that extends in a first direction; and a plurality of comb-shaped portions that protrude from the electrode base portion at a fixed distance away from each other, and extend in a second direction different from the first direction, and each comb-shaped portion has a coupling portion layered on or under the electrode base portion.

(2) The liquid crystal display device according to (1), wherein the first electrode and the second electrode are arranged in a position where a horizontal electric field for driving the liquid crystal layer is generated.

(3) The liquid crystal display device according to (2), wherein the first electrode is layered over the second electrode via an insulating layer.

(4) The liquid crystal display device according to (1), wherein when a voltage is applied between the first electrode and the second electrode, in the liquid crystal layer, liquid crystal molecules in an area near one of long sides of the comb-shaped portions that face each other in a width direction of a slit between adjacent comb-shaped portions and liquid crystal molecules in an area near the other one of the long sides of the comb-shaped portions that face each other rotate in opposite directions to each other.

(5) The liquid crystal display device according to (1), further comprising:

a first orientation film provided between the first electrode and the liquid crystal layer; and a second orientation film provided between the second substrate and the liquid crystal layer, wherein the first orientation film is subjected to an orientation process in a first orientation direction that is a parallel direction to the second direction, the second orientation film is subjected to an orientation process in a second orientation direction that is antiparallel to the first orientation direction, and when a voltage is not applied between the first electrode and the second electrode, long axes of liquid crystal molecules are aligned and oriented in the first orientation direction.

(6) The liquid crystal display device according to (5), wherein when a voltage is applied between the first electrode and the second electrode, long-axis directions of the liquid crystal molecules are oriented so that the liquid crystal molecules rise toward a direction perpendicular to the first substrate while rotating clockwise in an area near one of long sides of the comb-shaped portions that face each other in a width direction of a slit and rotating counterclockwise in an area near the other one in an in-plane direction of the first substrate.

(7) The liquid crystal display device according to (1), wherein the electrode base portion is formed of translucent conductive material.

(8) The liquid crystal display device according to (1), wherein the electrode base portion is formed of a metal material.

(9) The liquid crystal display device according to (1), wherein the comb-shaped portions are formed of a translucent conductive material.

(10) The liquid crystal display device according to (1), wherein the electrode base portion is provided under the coupling portion.

(11) An electronic apparatus comprising:

a liquid crystal display device according to (1); and a control device that supplies an input signal to the liquid crystal display device.

According to the present disclosure, it is possible to provide the liquid crystal display device and the electronic apparatus with the liquid crystal display device capable of improving the response speed and reducing the light transmission loss.

What is claimed is:

1. A liquid crystal display device comprising:

a first substrate and a second substrate that face each other;

a liquid crystal layer provided between the first substrate and the second substrate; and a first electrode and a second electrode provided between the first substrate and the liquid crystal layer, wherein the first electrode is one of a common electrode or a pixel electrode, wherein the second electrode is the pixel electrode when the first electrode is the common electrode, wherein the second electrode is the common electrode when the first electrode is the pixel electrode, and wherein the first electrode includes:

at least an electrode base portion that extends in a first direction; and a plurality of comb-shaped portions that protrude from the electrode base portion at a fixed distance away from each other, and extend in a second direction different from the first direction, each comb-shaped portion has a coupling portion layered on or under the electrode base portion, and electrical resistance of the electrode base portion is lower than electrical resistance of the comb-shaped portions.

2. The liquid crystal display device according to claim 1, wherein the first electrode and the second electrode are arranged in a position where a horizontal electric field for driving the liquid crystal layer is generated.

3. The liquid crystal display device according to claim 2, wherein the first electrode is layered over the second electrode via an insulating layer.

4. The liquid crystal display device according to claim 1, wherein when a voltage is applied between the first electrode and the second electrode, in the liquid crystal layer, liquid crystal molecules in an area near one of long sides of the comb-shaped portions that face each other in a width direction of a slit between adjacent comb-shaped portions and liquid crystal molecules in an area near the other one of the long sides of the comb-shaped portions that face each other rotate in opposite directions to each other.

5. The liquid crystal display device according to claim 1, further comprising:

a first orientation film provided between the first electrode and the liquid crystal layer; and a second orientation film provided between the second substrate and the liquid crystal layer, wherein the first orientation film is subjected to an orientation process in a first orientation direction that is a parallel direction to the second direction, the second orientation film is subjected to an orientation process in a second orientation direction that is anti-parallel to the first orientation direction, and when a voltage is not applied between the first electrode and the second electrode, long axes of liquid crystal molecules are aligned and oriented in the first orientation direction.

6. The liquid crystal display device according to claim 5, wherein when a voltage is applied between the first electrode and the second electrode, long-axis directions of the liquid crystal molecules are oriented so that the liquid crystal molecules rise toward a direction perpendicular to the first substrate while rotating clockwise in an area near one of long sides of the comb-shaped portions that face each other in a width direction of a slit and rotating counterclockwise in an area near the other one in an in-plane direction of the first substrate.

7. The liquid crystal display device according to claim 1, wherein the electrode base portion is formed of a translucent conductive material.

8. The liquid crystal display device according to claim 1, wherein the electrode base portion is formed of a metal material.

9. The liquid crystal display device according to claim 1, wherein the comb-shaped portions are formed of a translucent conductive material.

10. The liquid crystal display device according to claim 1, wherein the electrode base portion is provided under the coupling portion.

11. The liquid crystal display device according to claim 10, wherein a comb start width is a width of the each comb-shaped portion at a protrusion start position in the first direction, wherein a base width is a width of the electrode base portion in the second direction, and wherein the comb start width is wider than the base width.

12. The liquid crystal display device according to claim 1, wherein the electrode base portion is formed of a metal material, and the comb-shaped portions are formed of a translucent conductive material.

13. The liquid crystal display device according to claim 1, wherein the each comb-shaped portion has a comb start width that is a width in the first direction at a protrusion start position of the each comb-shaped portion, and a comb tip width that is a width in the first direction at a tip of the each comb-shaped portion, and wherein the comb start width is wider than the comb tip width.

14. The liquid crystal display device according to claim 13, wherein a comb protrusion length is a length from the protrusion start position to the tip of the each comb-shaped portion, wherein the comb protrusion length of the each comb-shaped portion on an upstream side in a rubbing direction is a first comb protrusion length, wherein the comb protrusion length of the each comb-shaped portion on a downstream side in the rubbing direction is a second comb protrusion length, and wherein the first comb protrusion length is shorter than the second comb protrusion length.

15. The liquid crystal display device according to claim 1, wherein a comb start width is a width of the each comb-shaped portion at a protrusion start position in the first direction, wherein a base width is a width of the electrode base portion in the second direction, and wherein the comb start width is wider than the base width.

16. An electronic apparatus comprising:

a liquid crystal display device; and a control device that supplies an input signal to the liquid crystal display device the liquid crystal display device comprising:

a first substrate and a second substrate that face each other;

a liquid crystal layer provided between the first substrate and the second substrate; and a first electrode and a second electrode provided between the first substrate and the liquid crystal layer, wherein the first electrode is one of a common electrode or a pixel electrode, wherein the second electrode is the pixel electrode when the first electrode is the common electrode, wherein the second electrode is the common electrode when the first electrode is the pixel electrode, and wherein the first electrode includes:

at least an electrode base portion that extends in a first direction; and a plurality of comb-shaped portions that protrude from the electrode base portion at a fixed distance away from each other, and extend in a second direction different from the first direction, each comb-shaped portion has a coupling portion layered on or under the electrode base portion, and electrical resistance of the electrode base portion is lower than electrical resistance of the comb-shaped portions.

* * * * *